United States Patent
Eto et al.

(10) Patent No.: US 10,053,305 B2
(45) Date of Patent: Aug. 21, 2018

(54) ARTICLE HANDLING APPARATUS AND METHOD OF OPERATING THE SAME

(71) Applicant: Kabushiki Kaisha Toshiba, Minato-ku (JP)

(72) Inventors: Haruna Eto, Kawasaki (JP); Akihito Ogawa, Fujisawa (JP); Takafumi Sonoura, Yokohama (JP); Hideichi Nakamoto, Tokyo (JP); Junya Tanaka, Tokyo (JP); Rie Katsuki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/066,128

(22) Filed: Mar. 10, 2016

(65) Prior Publication Data
US 2016/0347558 A1  Dec. 1, 2016

(30) Foreign Application Priority Data
May 28, 2015 (JP) .................................. 2015-108263

(51) Int. Cl.
| | |
|---|---|
| *B65H 3/00* | (2006.01) |
| *B65G 59/02* | (2006.01) |
| *B65G 59/04* | (2006.01) |
| *B65G 47/91* | (2006.01) |

(52) U.S. Cl.
CPC ............. *B65G 59/04* (2013.01); *B65G 47/91* (2013.01)

(58) Field of Classification Search
CPC .................. B65G 59/04; B65G 17/91
USPC ........................................................ 414/796.9
See application file for complete search history.

(56) References Cited

U.S. PATENT DOCUMENTS

| | | | | |
|---|---|---|---|---|
| 8,473,094 | B2* | 6/2013 | Becker | B65G 47/918 294/65 |
| 9,333,649 | B1* | 5/2016 | Bradski | B25J 9/163 |
| 9,393,686 | B1* | 7/2016 | Bradski | B25J 9/163 |
| 9,498,887 | B1* | 11/2016 | Zevenbergen | B25J 15/0616 |
| 2003/0185656 | A1 | 10/2003 | Hansl | |
| 2006/0104788 | A1* | 5/2006 | Ban | B25J 9/1697 414/729 |
| 2007/0282485 | A1* | 12/2007 | Nagatsuka | B25J 9/1671 700/245 |

(Continued)

FOREIGN PATENT DOCUMENTS

| | | |
|---|---|---|
| JP | 6-144575 A | 5/1994 |
| JP | 06144575 A * | 5/1994 |

(Continued)

*Primary Examiner* — Rakesh Kumar
(74) *Attorney, Agent, or Firm* — Oblon, McClelland, Maier & Neustadt, L.L.P.

(57) ABSTRACT

According to one embodiment, an article handling apparatus includes a gripper, a supporting portion, a sensor, and controller. The gripper grips an article. The supporting portion supports an article from below. The sensor recognizes a plurality of articles to generate a recognition result. The controller calculates a position of a first article located highest among the plurality of articles based on the recognition result, calculates a position of a second article located second highest in a region determined based on the position of the first article, controls movement of the gripper based on the position of the first article, and controls the movement of the supporting portion based on the position of the second article.

6 Claims, 25 Drawing Sheets

(56) References Cited

U.S. PATENT DOCUMENTS

| | | | | |
|---|---|---|---|---|
| 2014/0050557 A1* | 2/2014 | Criswell | ................ | B65G 67/08 |
| | | | | 414/809 |
| 2014/0079524 A1* | 3/2014 | Shimono | ................ | B25J 9/1669 |
| | | | | 414/796.9 |
| 2014/0205403 A1* | 7/2014 | Criswell | .................. | B25J 5/007 |
| | | | | 414/395 |
| 2015/0063973 A1* | 3/2015 | Girtman | ................ | B25J 9/0093 |
| | | | | 414/796.9 |
| 2015/0344225 A1* | 12/2015 | Nakamura | ........... | B65G 47/912 |
| | | | | 414/273 |
| 2016/0221187 A1* | 8/2016 | Bradski | .................... | B25J 9/163 |
| 2016/0347558 A1* | 12/2016 | Eto | ........................ | B65G 59/04 |
| 2017/0021502 A1* | 1/2017 | Nusser | .................. | B25J 9/1679 |

FOREIGN PATENT DOCUMENTS

| | | | | |
|---|---|---|---|---|
| JP | 06144575 A | * | 5/1994 | ................ 414/797.3 |
| JP | 7-133006 A | | 5/1995 | |
| JP | 2013-129034 A | | 7/2013 | |
| JP | 2014-50936 A | | 3/2014 | |
| JP | 2015-224125 A | | 12/2015 | |

\* cited by examiner

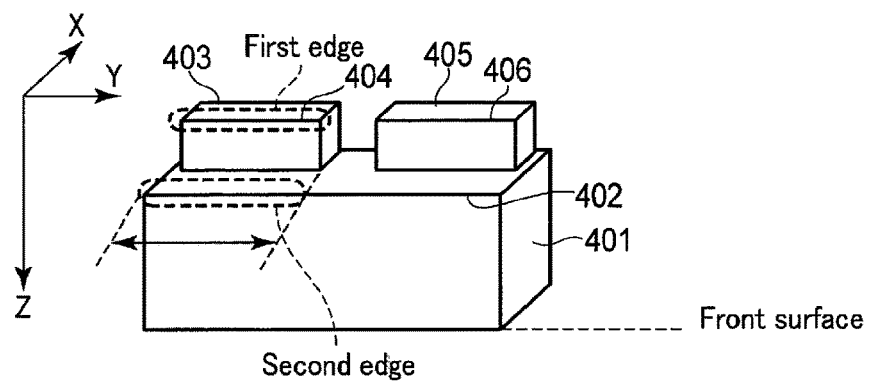
F I G. 4A
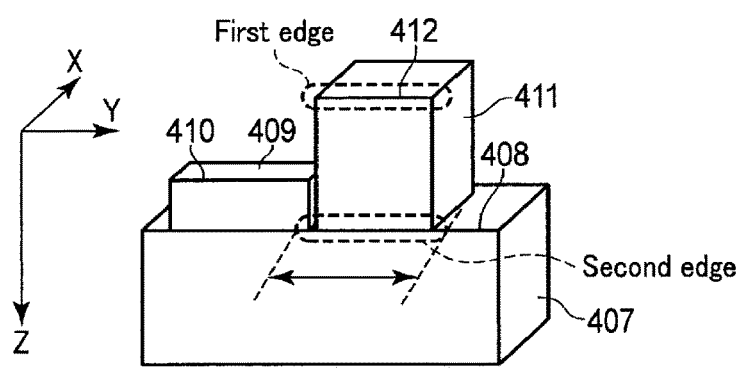
F I G. 4B
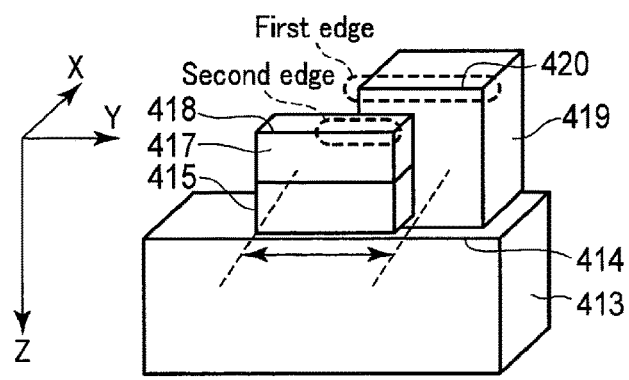
F I G. 4C

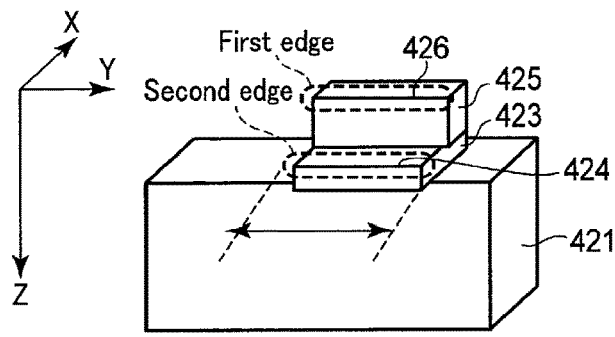
F I G. 4D
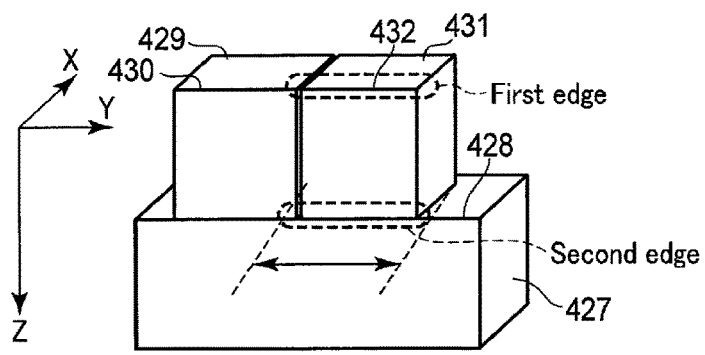
F I G. 4E
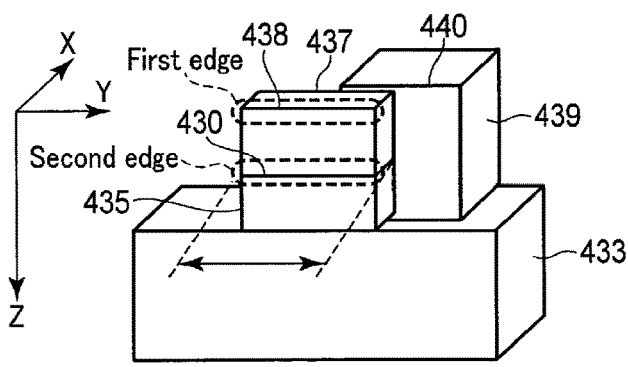
F I G. 4F

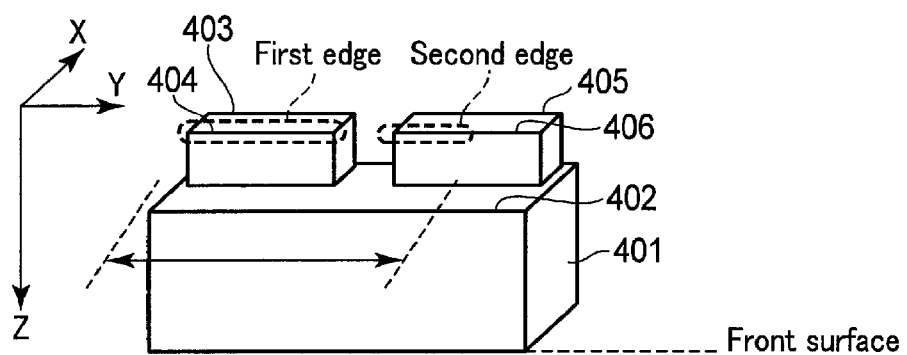
F I G. 4G
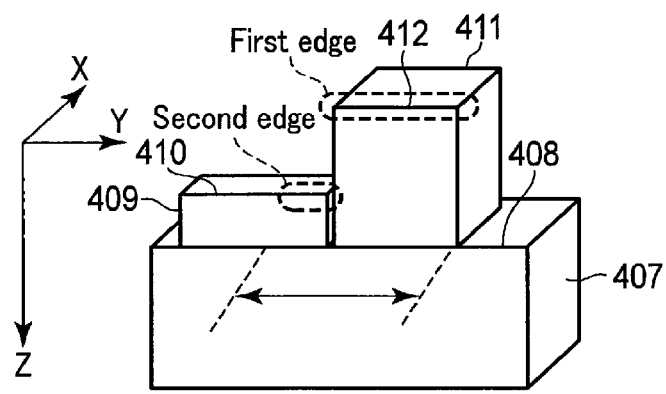
F I G. 4H

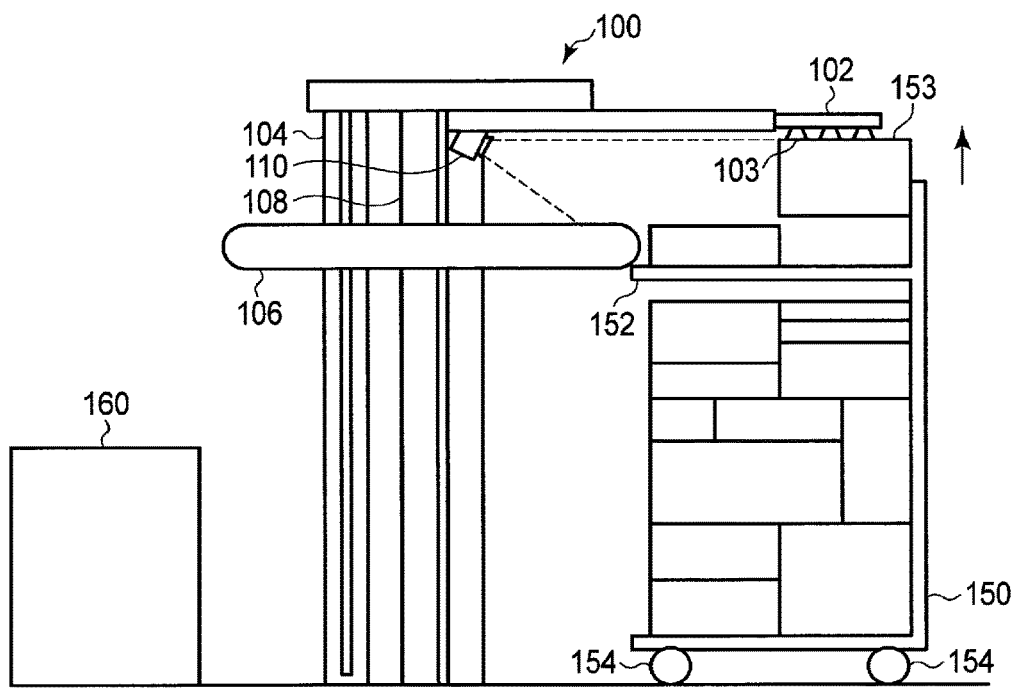
F I G. 6C
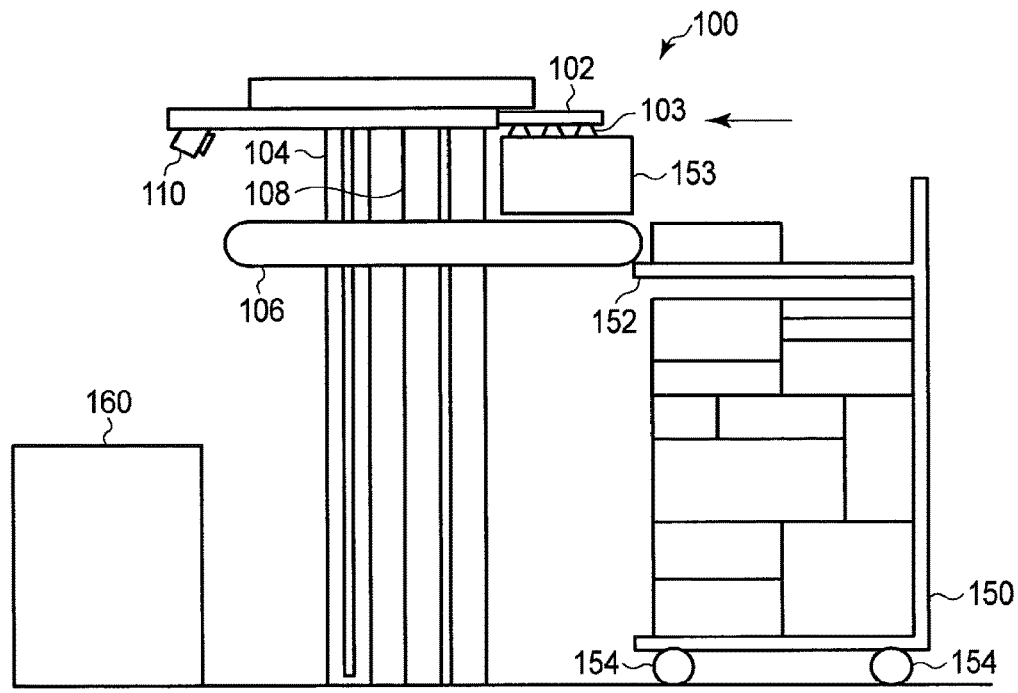
F I G. 6D

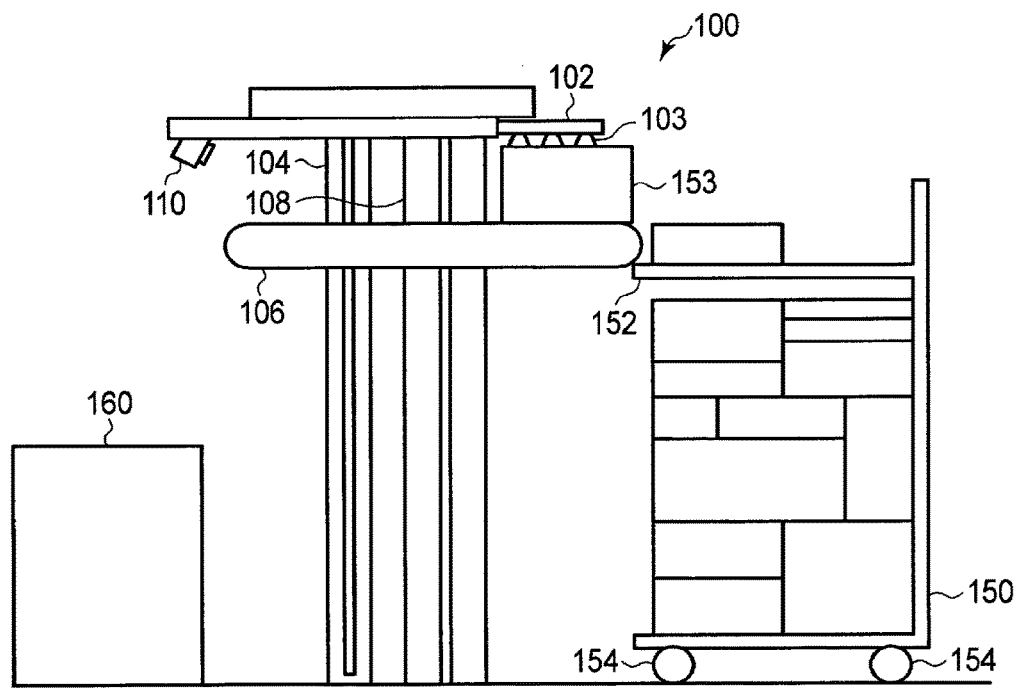
F I G. 6E
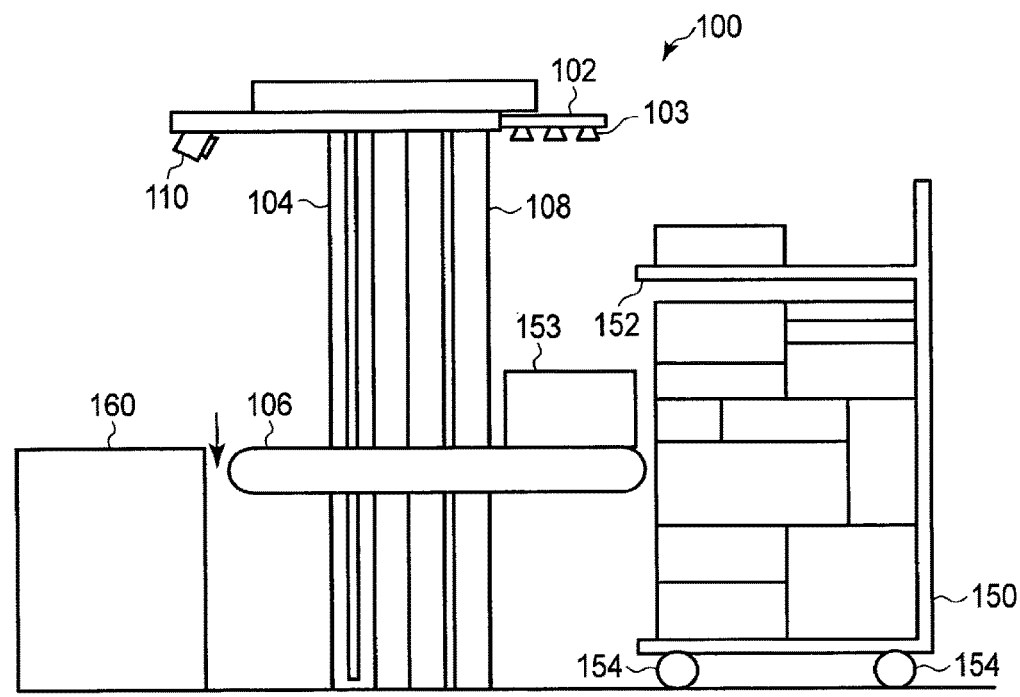
F I G. 6F

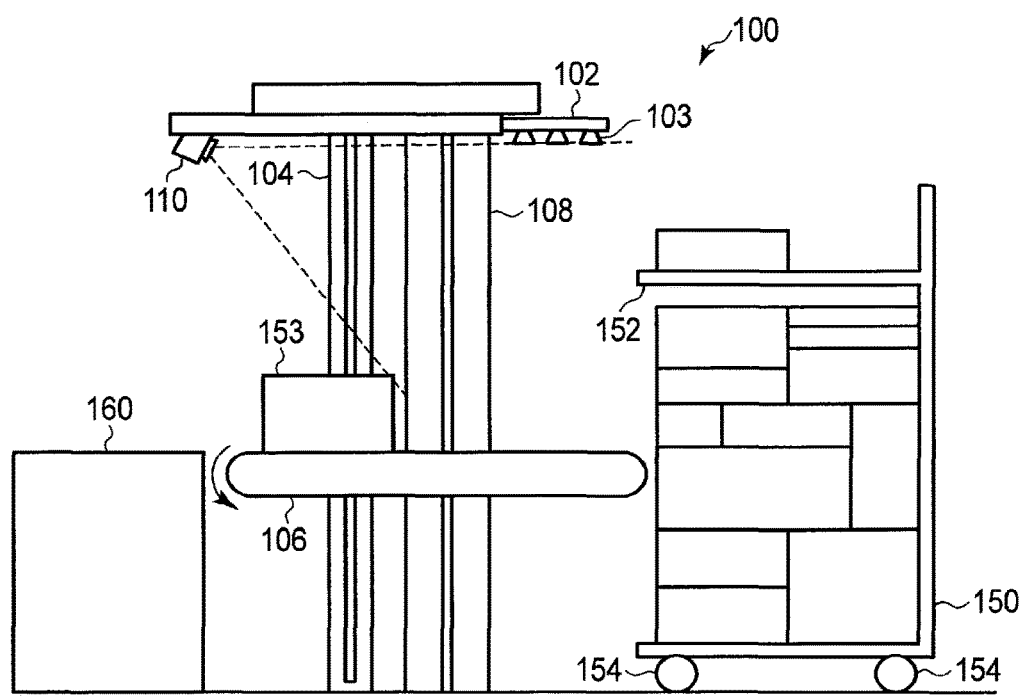
F I G. 6G
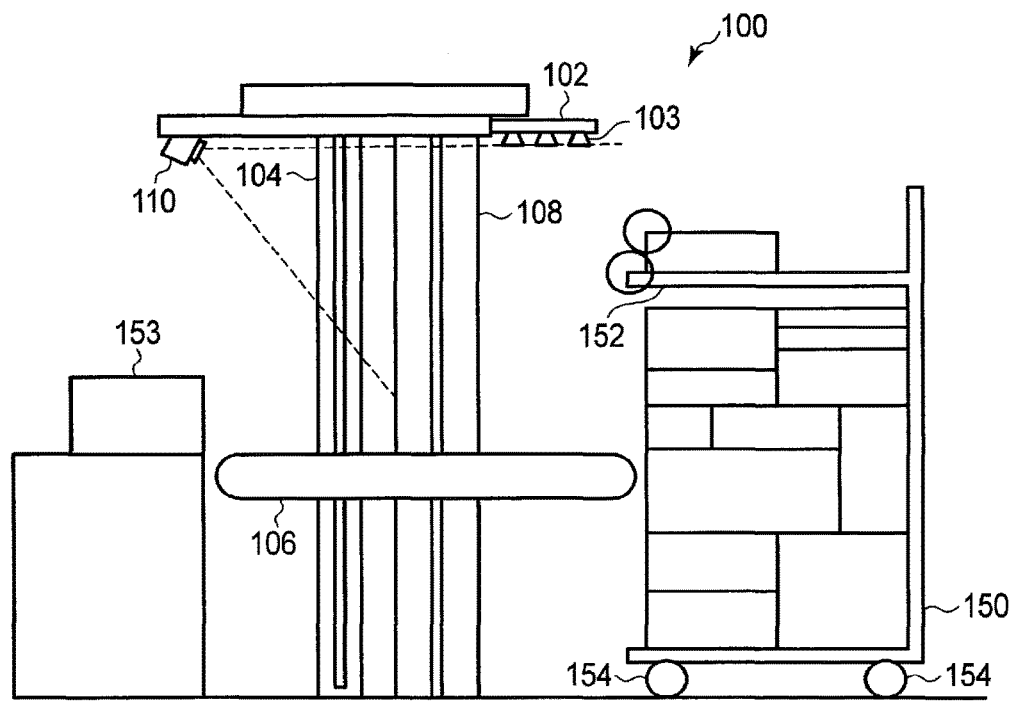
F I G. 6H

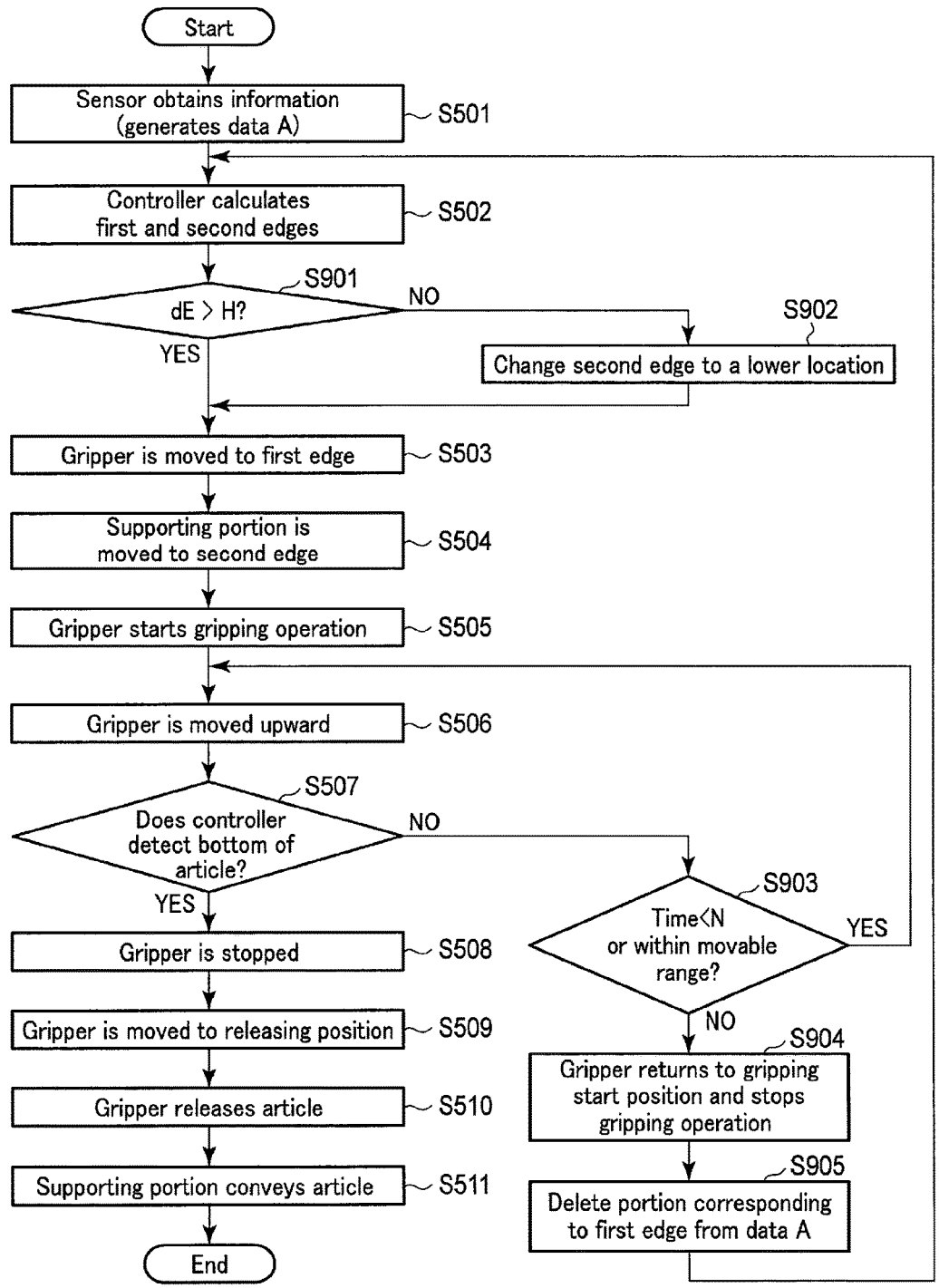
F I G. 9

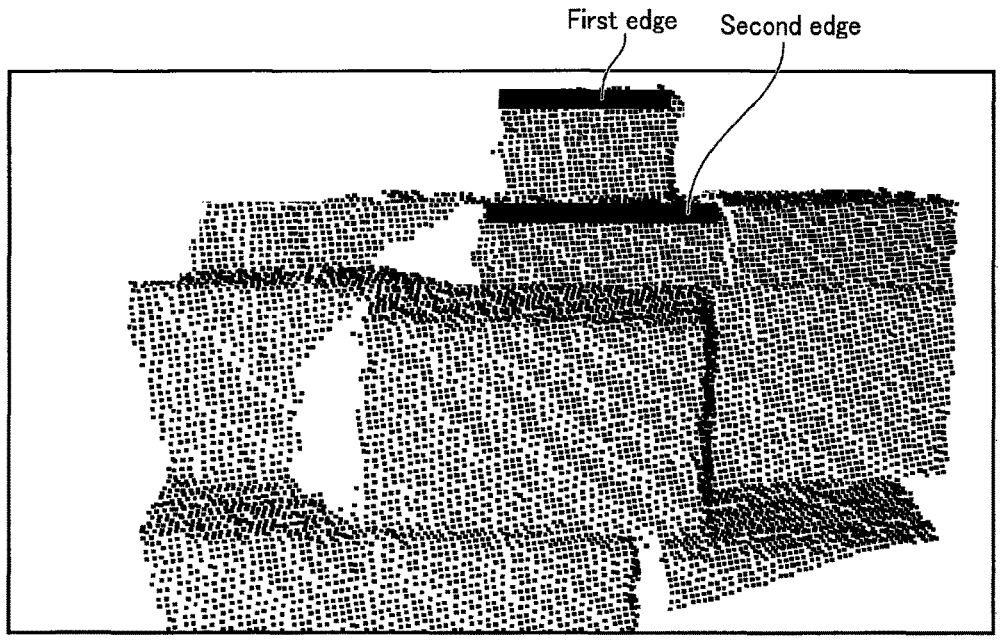
F I G. 11A
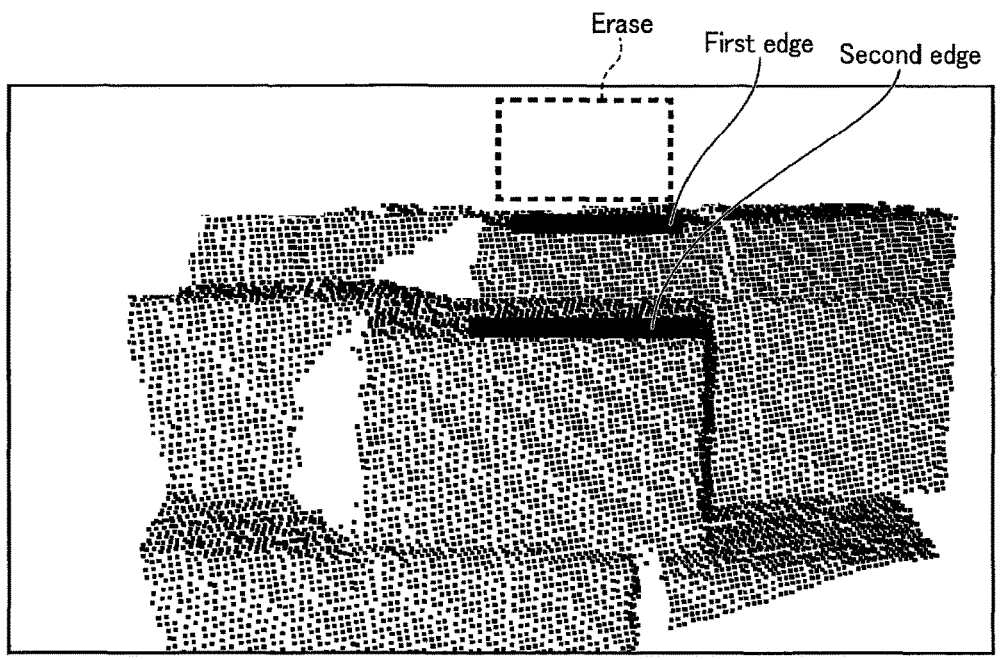
F I G. 11B

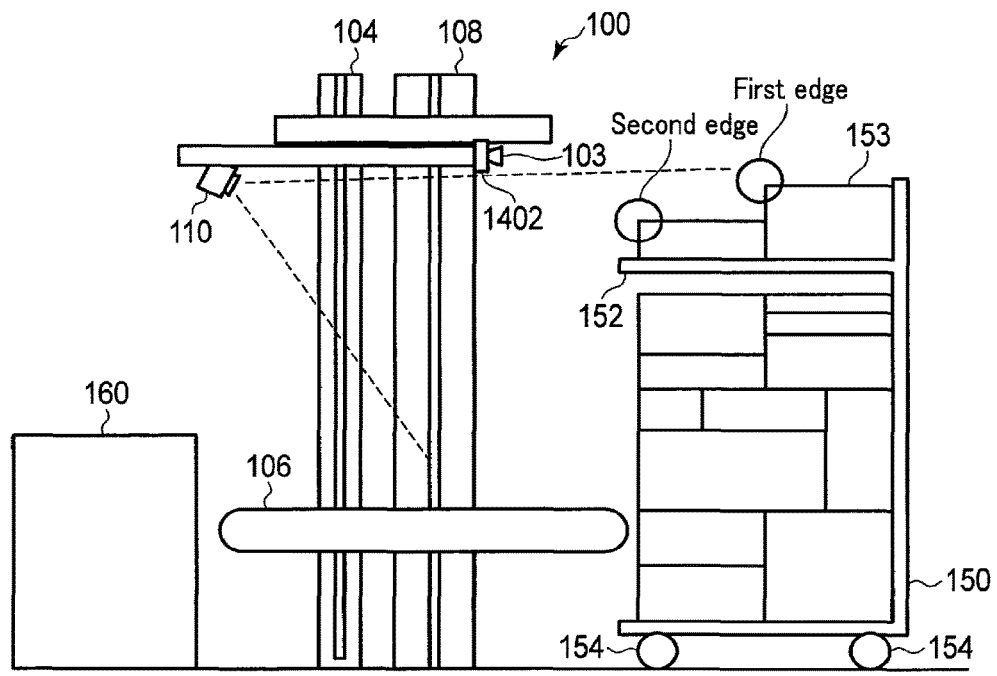
F I G. 14A
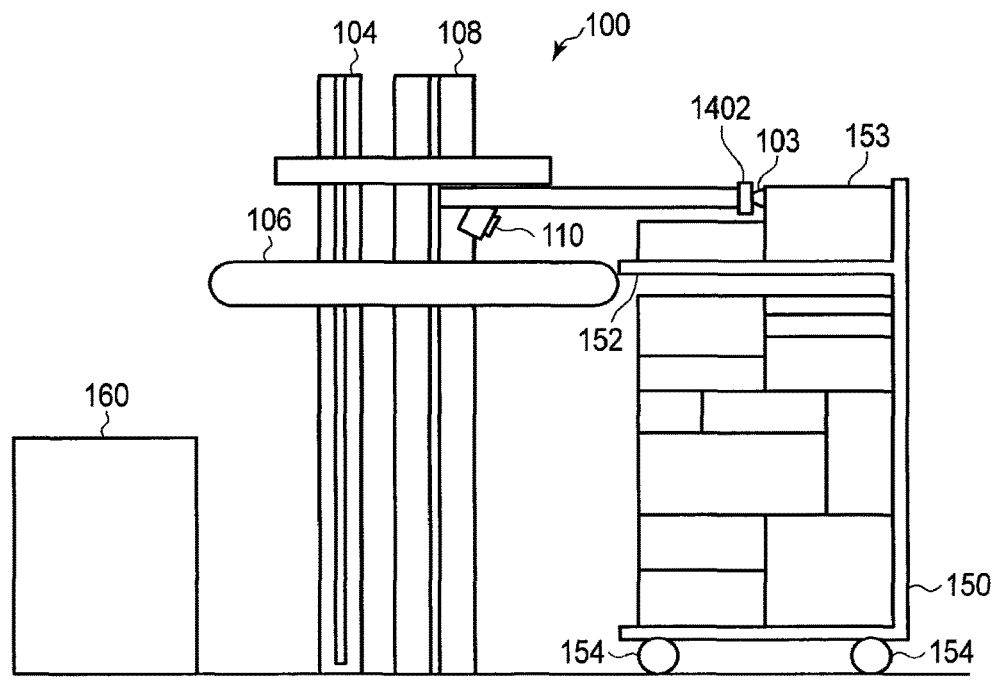
F I G. 14B

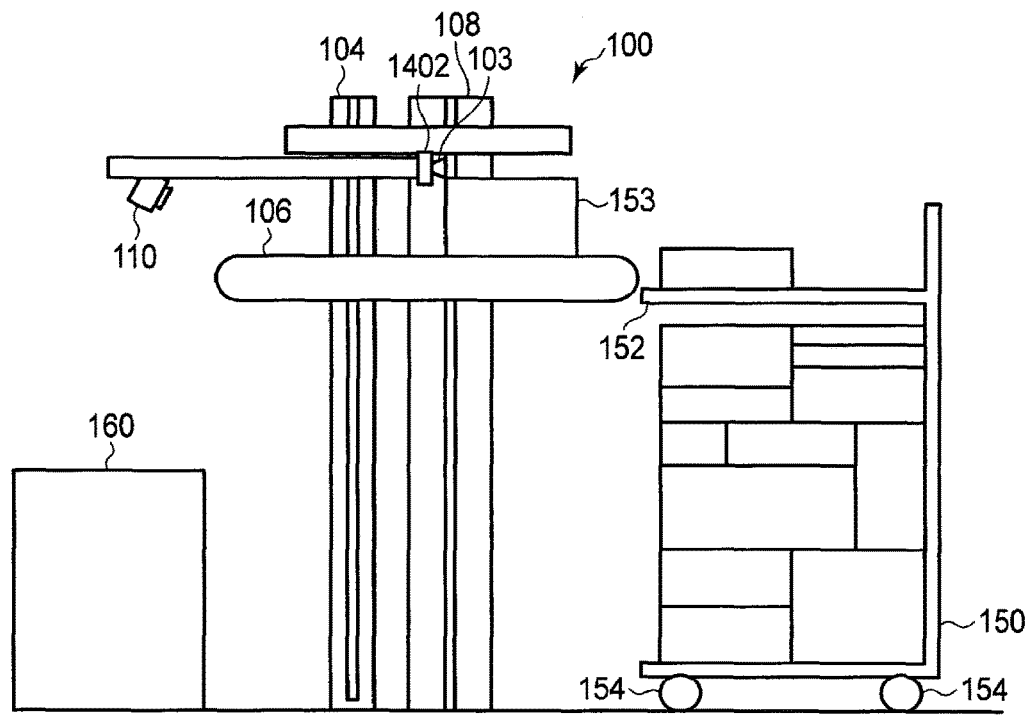
F I G. 14E
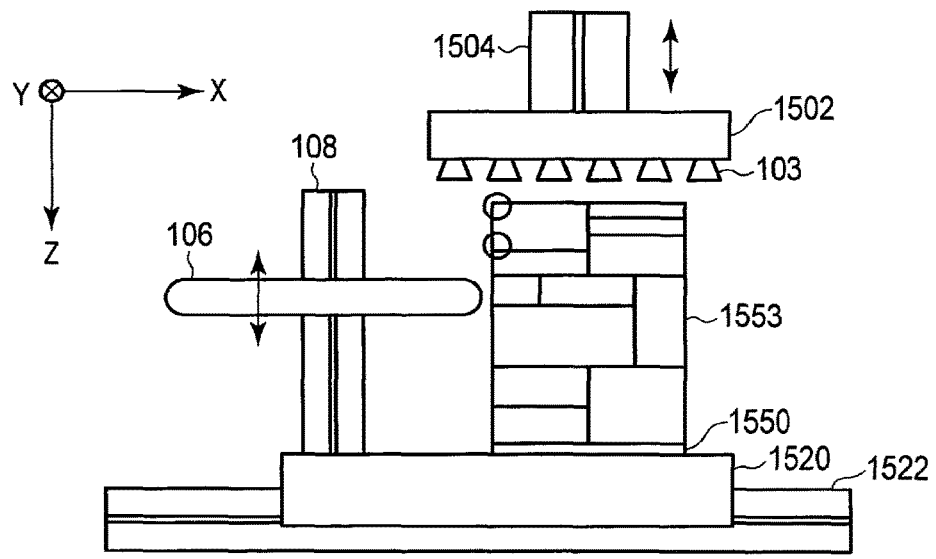
F I G. 15A

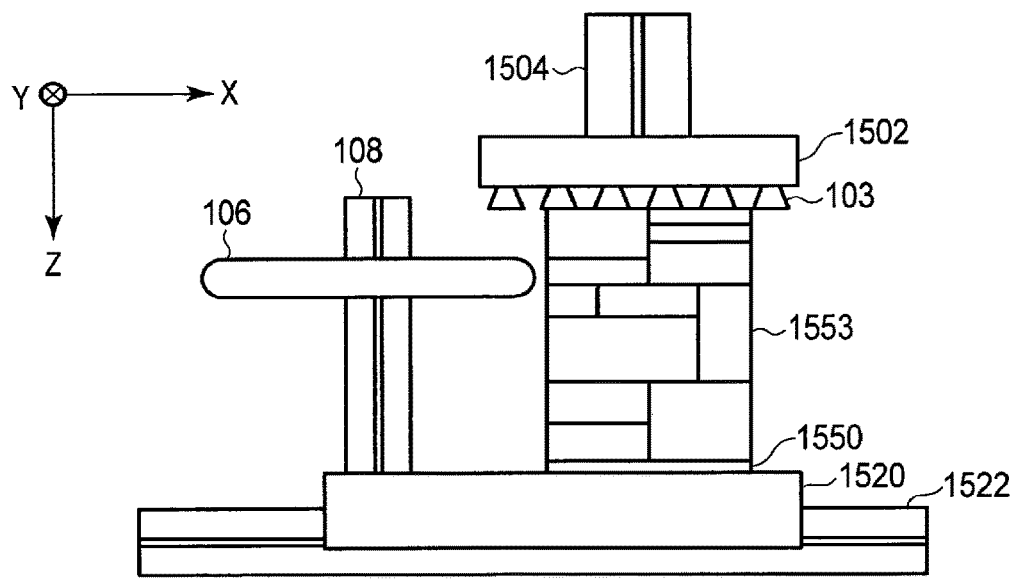
F I G. 15B
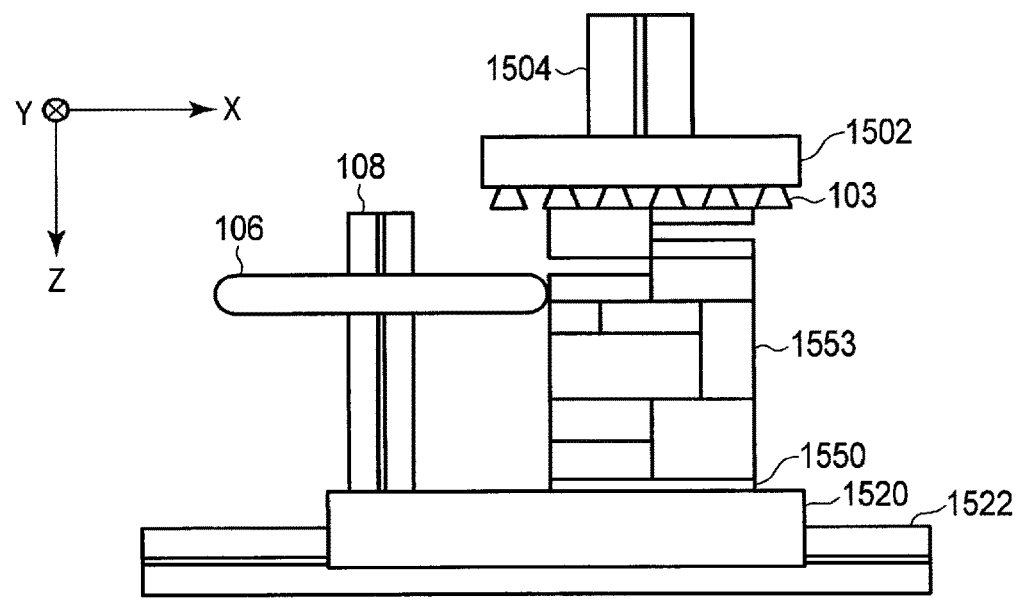
F I G. 15C

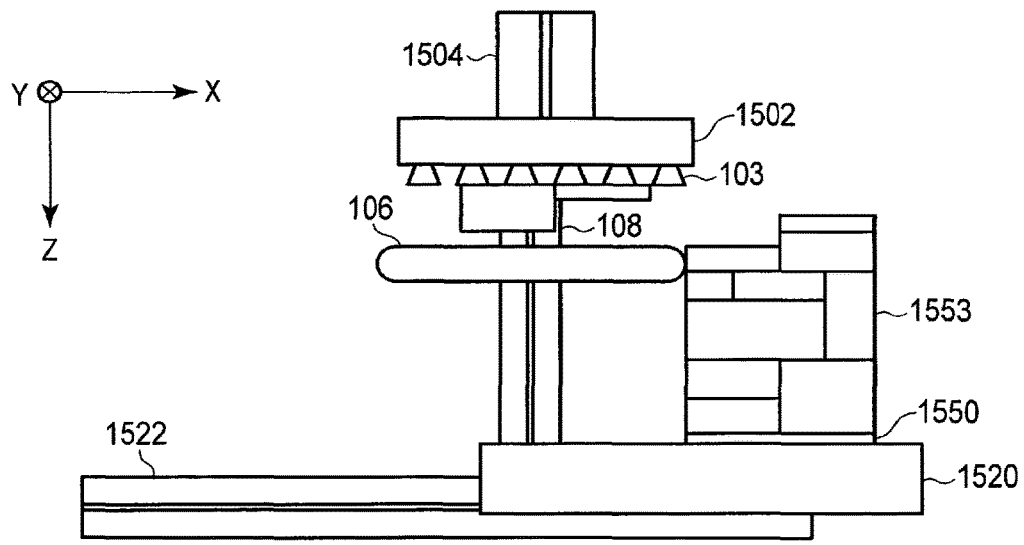
F I G. 15D
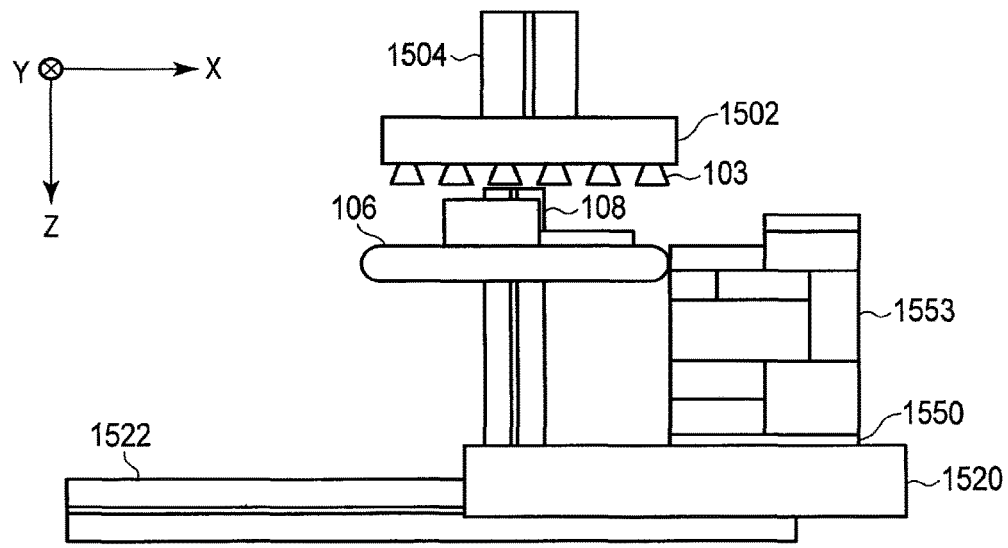
F I G. 15E

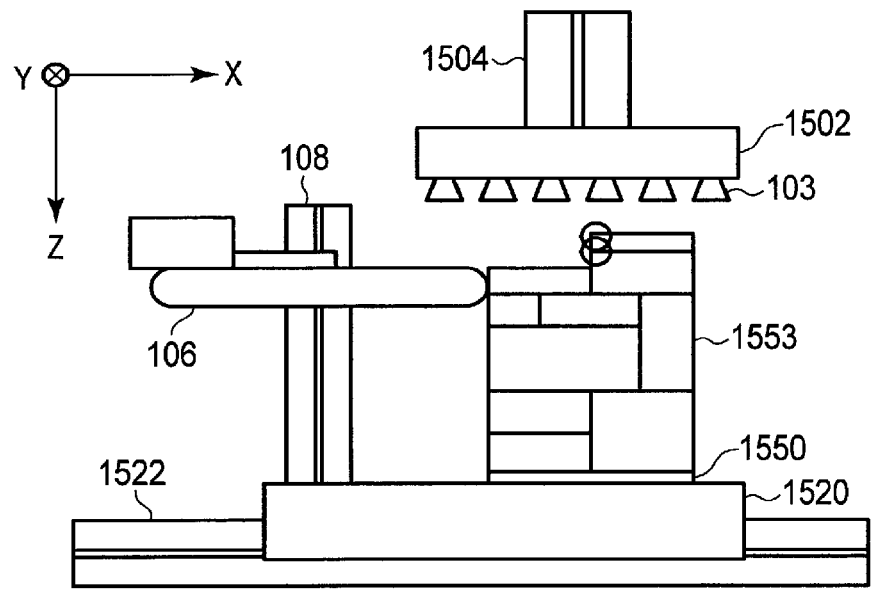
F I G. 15F
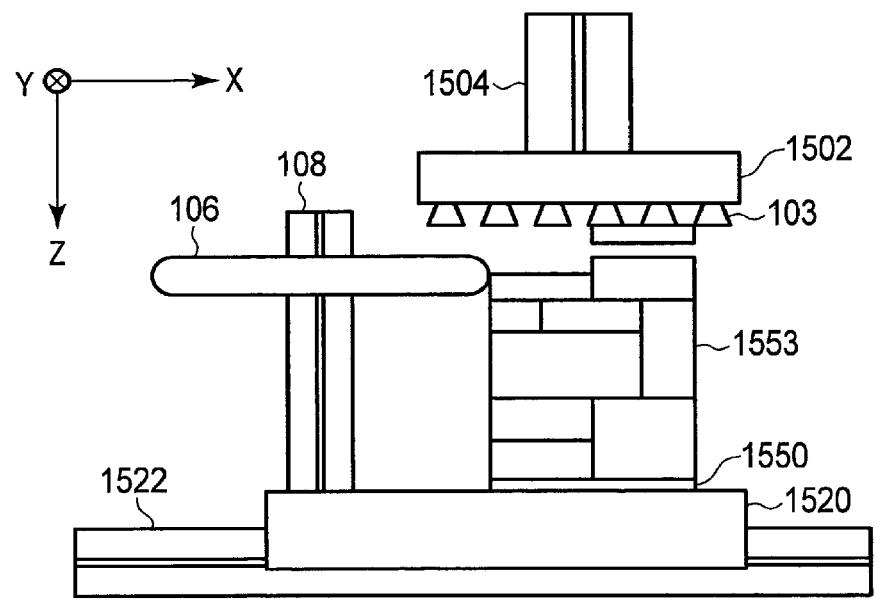
F I G. 15G

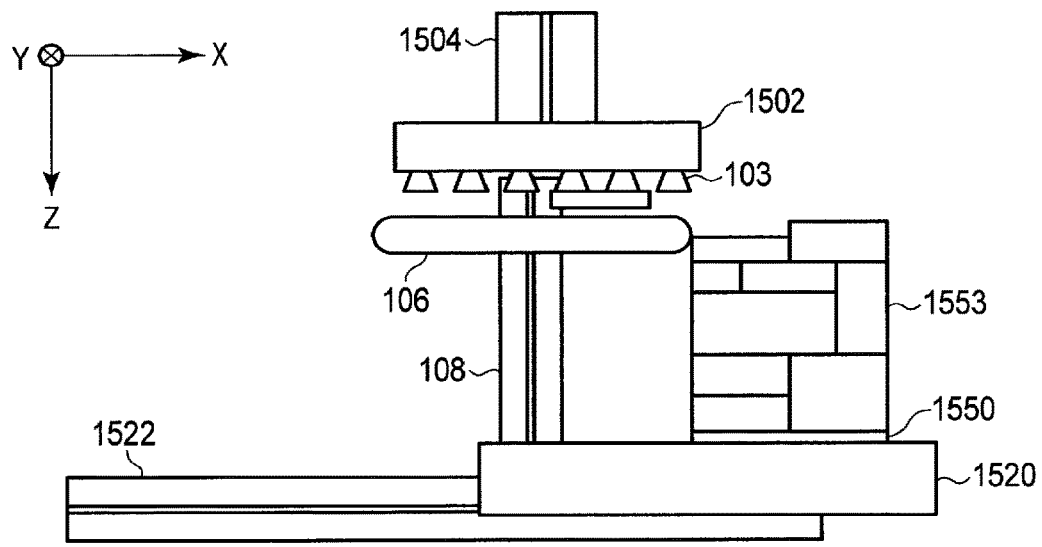
F I G. 15H
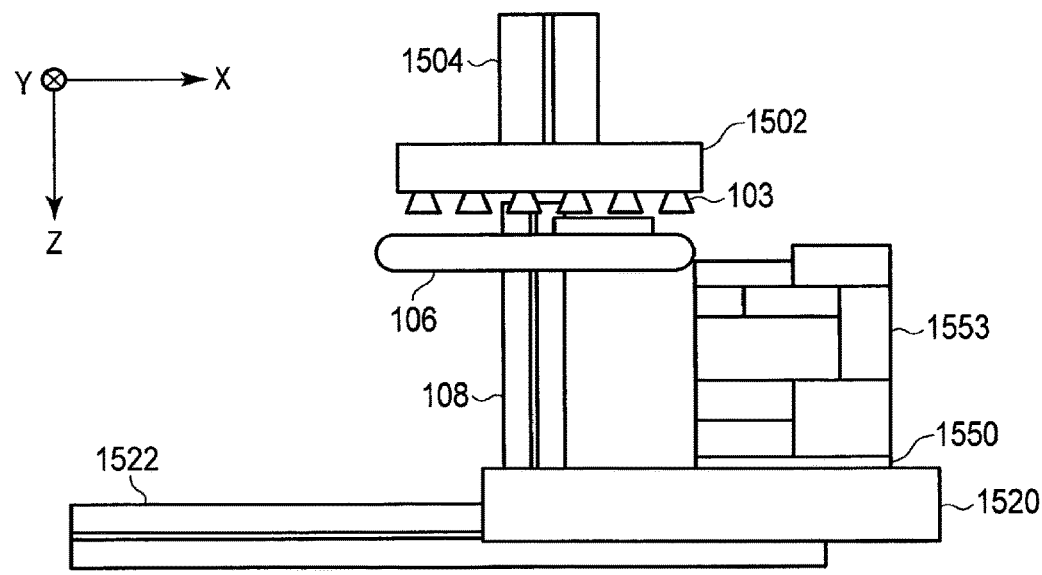
F I G. 15I

000
ARTICLE HANDLING APPARATUS AND METHOD OF OPERATING THE SAME

CROSS-REFERENCE TO RELATED APPLICATIONS

This application is based upon and claims the benefit of priority from Japanese Patent Application No. 2015-108263, filed May 28, 2015, the entire contents of which are incorporated herein by reference.

FIELD

Embodiments described herein relate generally to an article handling apparatus and a method of operating the apparatus.

BACKGROUND

Handling of articles at factories and physical distribution warehouses is heavy work, and it has been difficult to secure human resources for such article handling work. Under this circumstance, automation of unloading articles from a pallet of loaded articles, such as depalletizing, has been in demand. A conventional article handling apparatus may fail at unloading articles stacked in a complicated manner, such as when articles of various shapes are manually stacked by trial and error.

BRIEF DESCRIPTION OF THE DRAWINGS

FIGS. 4A, 4B, 4C, 4D, 4E, 4F, 4G and 4H are perspective views showing examples of the pattern of the first edge and the second edge.

FIGS. 6A, 6B, 6C, 6D, 6E, 6F, 6G, and 6H are a series of side views illustrating an example operation of the article handling apparatus shown in FIG. 1.

FIG. 9 is a flowchart showing another example of procedures for transferring articles by the article handling apparatus shown in FIG. 1.

FIG. 11A is a schematic view showing original recognition data.

FIG. 11B is a schematic view showing updated recognition data.

FIGS. 14A, 14B, 14C, 14D, and 14E are a series of side views illustrating an example operation of the article handling apparatus shown according to the second embodiment.

FIG. 15A is a side view showing the article handling apparatus according to the third embodiment.

FIGS. 15B, 15C, 15D, 15E, 15F, 15G, 15H, and 15I are a series of side views illustrating an example operation of the article handling apparatus according to the third embodiment.

DETAILED DESCRIPTION

According to one embodiment, an article handling apparatus includes a gripper, a supporting portion, a sensor, and controller. The gripper grips an article. The supporting portion supports an article from below. The sensor recognizes a plurality of articles to generate a recognition result. The controller calculates a position of a first article located highest among the plurality of articles based on the recognition result, calculates a position of a second article located second highest in a region determined based on the position of the first article, controls movement of the gripper based on the position of the first article, and controls the movement of the supporting portion based on the position of the second article.

In the following, the article handling apparatus according to the present embodiments will be described with reference to the drawings. The article handling apparatus according to the present embodiments is applicable to an automatic feeding apparatus in physical distribution, and an article supply apparatus at a factory, etc. In the following embodiments, the same elements will be assigned the same reference symbols, and redundant explanations will be omitted as appropriate.

First Embodiment

Figure 1:
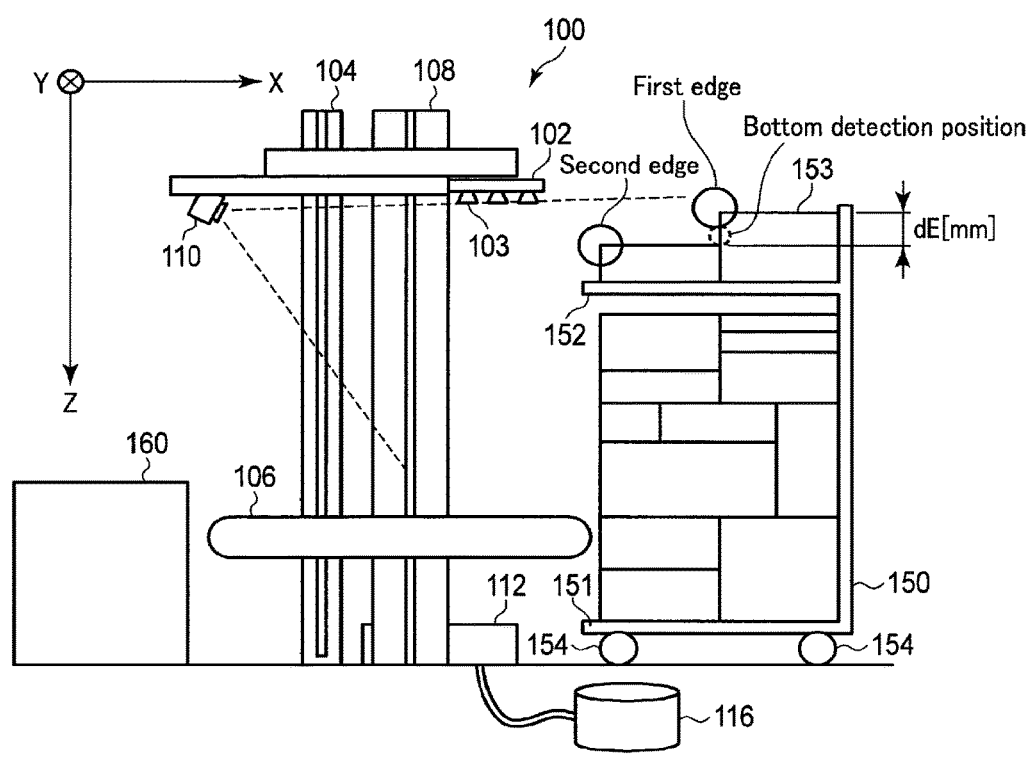
FIG. 1 is a side view showing the article handling apparatus according to the first embodiment.
Figure 2:
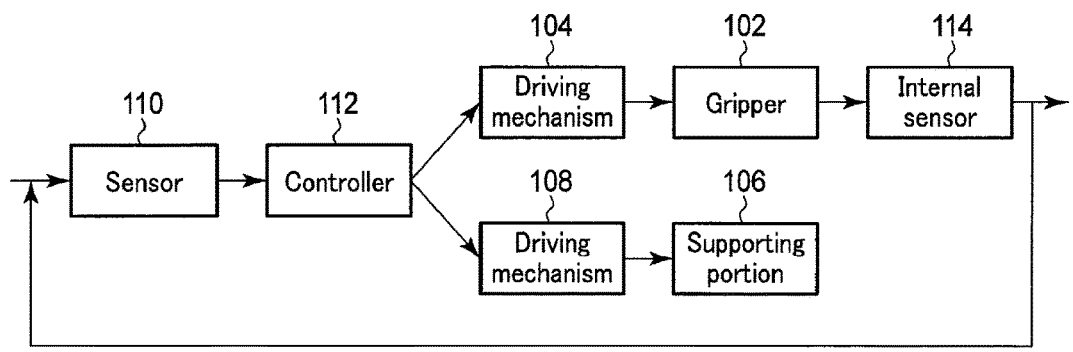
FIG. 2 is a block diagram showing the article handling apparatus according to the first embodiment.

FIGS. 1 and 2 are a side view and a block diagram schematically showing an article handling apparatus 100 according to the first embodiment. In the example shown in FIG. 1, a box pallet 150 is located to the front of the article handling apparatus 100, and a belt conveyor 160 is located to the rear of the article handling apparatus 100. Articles in various shapes are stacked on the bottom portion 151 and the intermediate shelf 152 of the box pallet 150. The box pallet 150 is a roll box pallet (RBP) having wheels 154, and the article handling apparatus 100 and the belt conveyor 160 are fixed to the ground. The article handling apparatus 100 may be movable. For example, the article handling apparatus 100 may be equipped with wheels, or may move along rails. The box pallet 150 is an example of a load area.

The article handling apparatus 100 takes an article 150 from the box pallet 150, and transfers (conveys) it to the belt conveyor 160. It should be noted that the destination to which the article 153 is transferred by the article handling apparatus 100 (i.e., an unloading place) is not limited to the belt conveyor 160; it may be a truck, a pallet, or a workbench, etc.

The article handling apparatus 100, as shown in FIGS. 1 and 2, includes a gripper 102 which grips or holds articles, a driving mechanism which moves the gripper 102, a supporting portion 106 which supports the articles from below, a driving mechanism 108 which moves the supporting portion 106, an internal sensor 114 which detects a location of the gripper 102, and a controller 112.

The gripper 102 is connected to the driving mechanism 104, and is movable in the direction of three axes. Specifically, the driving mechanism 104 drives the gripper 102 in a vertical direction, a forward and backward direction, and a lateral direction. The orthogonal coordinate axes are shown in FIG. 1 for the sake of explanation. The Z axis corresponds to a vertical direction, the x axis corresponds to a forward and backward direction, and the Y axis corresponds to a width direction. The forward and backward direction and the width direction are horizontal directions, which are in parallel with the ground plane on which the article handling apparatus 100 is placed. Typically, a horizon direction is in parallel with the bottom surface of the articles which are targets for gripping. The gripper 102 is arranged to face toward the opening plane of the box pallet 150. The gripper 102 includes a plurality of suction cups 103 coupled to a vacuum pump (not shown) to grip an article by suction. The suction cups 103 are provided on the bottom surface of the gripper 102.

The supporting portion 106 is connected to the driving mechanism 108, and is movable in a one-axis direction. Specifically, the driving mechanism 108 drives the supporting portion 106 in the vertical direction. The supporting portion 106 is, for example, a belt conveyor that can convey an article in the forward and backward direction.

The above-described structures of the gripper 120, the driving mechanism 104, the supporting portion 106, and the driving mechanism 108 are examples. The gripper 102 may grip the articles by clipping. Other structure examples will be described in the second and third embodiments.

A sensor 110 is provided in the gripper 102. The sensor 110 recognizes the stacked articles which are taken into the field of view in the horizontal direction. A camera capable of measuring three-dimensional locations, such as an infrared dot pattern projection type camera, may be used as the sensor 110. In the following description, it is assumed that the sensor 110 is an infrared dot pattern projection type camera. The infrared dot pattern projection type camera projects infrared dot patterns on an object to capture an infrared image of the object. Three-dimensional information of the object can be obtained by analyzing the infrared image. The infrared dot pattern projection type camera can also capture a color image or black-and-white image. In addition to the infrared dot pattern projection type camera, the sensor 110 may further include an optical sensor, such as a camera for taking color or black-and-white images. The sensor 110 may be provided at a place other than the gripper 102. For example, the sensor 110 may be attached to the supporting portion 106.

Since the sensor 110 is provided at the gripper 102 in the present embodiment, the sensor 110 is moved along with the gripper 102. Thus, the sensor 110 can recognize the articles within a wide range. When the sensor 110 carries out recognition, the sensor 110 is driven to a position where the highest part of the stacked articles is located slightly below the upper limit of the recognition range, and the supporting portion 106 is moved downward to a position where the supporting portion 106 does not be an obstacle for recognition.

The controller 112 receives an image as a recognition result from the sensor 110, and determines a movement target position for each of the gripper 102 and the driving mechanism 104 based on the image. Specifically, the controller 112 calculates, based on the received image, a position of an article which is located the highest among the stacked articles (may be referred to as the first article or the target article). Subsequently, the controller 112 calculates, based on the received image, a position for an article located the second highest in an area which is determined based on the position calculated for the first article (may be referred to as the second article). In the present embodiment, an article position calculated by the controller 112 is the position of an edge which is defined by the upper surface and the front surface of an article. The front surface refers to a side surface facing the article handling apparatus 100. The edge defined by the upper surface and the front surface of a first article is called the first edge, and the edge defined by the upper surface and the front surface of a second article is called the second edge. The controller 112 controls movement of the gripper 102 based on the calculated position of the first edge, and controls movement of the supporting portion 106 based on the calculated position of the second edge. For example, the gripper 102 is moved immediately above the first article to access the first article, and the supporting portion 106 is moved to the same height as the second edge. The gripper 102 grips the first article by suction, and brings down the first article to the supporting portion 106. The supporting portion conveys the first article to the belt conveyor 160.

The controller 112 may be implemented by a computer including a processor and a memory, or by LSI (large scale integration), for example.

Generally, when a gripper tries to grip a particular article, the gripper needs to grip the article accurately without touching the articles in the vicinity, and after gripping, the article needs to be pulled out without touching the articles in the vicinity by moving the gripper properly. To achieve this, it is necessary to determine a three-dimensional location and attitude of a target article with high accuracy. For articles that are stacked in an untidy manner, a proper position to grip an article and a direction to pull the article without disturbing other articles vary from article to article. Furthermore, when accurate gripping cannot be achieved, a system may have to stop. Configuring a flow that allows a retry of the gripping process without stopping the system would require a greater number of sensors for a system, or a complicated processing system. This is not desirable from the viewpoint of cost and management.

In the present embodiment, selecting an article located the highest as a target for holding and a direction to pull out the selected article in an upward direction are set as basic rules. Therefore, it is possible to pull out an article even if the position of a gripping target article includes an error by orders of a few centimeters, as long as the error falls under the range where the error can be absorbed by a buffer function provided in the gripper 102, such as a spring. According to the present embodiment, it is possible to grip and pull out an article safely and reliably in any loading (stacking) patterns, and to prevent an unnecessarily complicated system configuration. Furthermore, the rules may include driving the supporting portion 106 to the same height as the position of the second edge, and having the supporting portion 106 wait until an article that has been pulled out is loaded onto the supporting unit 106. Thus, a time during which an article is being held in space can be minimized, thereby achieving safe conveyance.

The article handling apparatus 100 comprising the above-described structures does not require registration of article sizes and a loading method in advance. In other words, the article handling apparatus 100 can unload the articles having various shapes stacked in an untidy manner.

The information about the articles may be registered in the database 116 in advance, and the controller 112 may calculate the position of the first edge and the position of the second edge based on the information. For example, the invention about the articles may include information indicating article sizes (shapes). Information about the articles may be registered by an operator using an input device (not shown).

Figure 3:
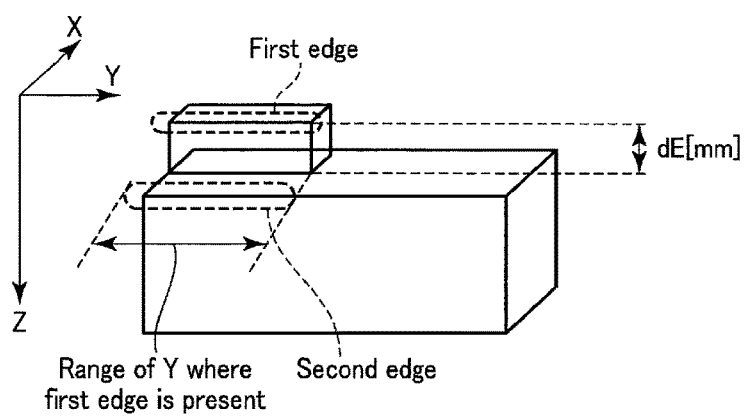
FIG. 3 is a perspective view illustrating an example method of calculating a first edge and a second edge.

An example method of calculating the position of a first edge and the position of a second edge will be explained with reference to FIG. 3.

A first edge is an edge of an article that is present on a highest horizontal plane among the stacked articles. If a plurality of articles are present on a highest horizontal plane, an edge of a most frontward article (i.e., an article closest to the opening plane of the box pallet 150) among the articles is determined as a first edge. A second edge is an edge of an article that is present the second highest to the first edge in the region which shares the width with the first edge.

If the sensor 110 is a three-dimensional sensor, such as an infrared dot projection camera, the edges can be calculated by converting the data obtained by the sensor 110 into point group data in a three-dimensional space. Although not shown in FIG. 3, the sensor 110 is located in the negative X axis-direction with respect to the article. The first edge is obtained by specifying point groups each including a plurality of points having a minimum value of Z (i.e., a plurality of points located the highest) and being close to each other from the point group data obtained by the conversion, sorting the point groups by the values of Y, and extracting a point group with a minimum value of X within an arbitrary range of the values of Y. The second edge is calculated in a manner similar to the calculation of the first edge, but the calculation is made within the range of Y where the first edge exists. It should be noted that the second edge is selected from point groups other than a point group corresponding to the first edge. Alternatively, any lateral line in the region immediately below the first edge detected as a result of image processing may be detected as a second edge. According to such a method, the first edge and the second edge can be reliably extracted by a minimum amount of calculation.

If a system configuration requires fewer restraints on an amount of calculation, the position of the first edge and the position of the second edge can be calculated using a mathematical algorithm for statistically detecting planes. It should be noted, however, a sufficient amount of data needs to be guaranteed in a case of referring to a statistic model.

The patterns of the first edge and the second edge calculated by the above-described method are shown in FIG. 4A to FIG. 4H. In FIG. 4A, the articles 403 and 406 having the same shape are placed on the article 401, and the height (the position in the Z-axis direction) and depth (the position in the X-axis direction) of the edge 404 of the article 403 are the same as those of the edge 406 of the article 405. In this case, the first edge is either the edge 404 or the edge 406. In this example, the edge 404 is detected as the first edge. The edge 402 of the article 401 located below the first edge is detected as the second edge.

In FIG. 4B, the articles 409 and 411 are placed on the article 407, and the height of the edge 412 of the article 411 is greater than that of the edge 410 of the article 409. In this case, the edge 412 is detected as the first edge. Since the front surface of each of the articles 407, 409, and 411 is located on the same plane, no edge can be detected in front of the first edge. In this case, for example, a lateral line is detected in a region which is specified based on the first edge, using a color image or a black-and-white image, and the detected lateral line is detected as the second edge. In the example shown in FIG. 4B, the edge 408 of the article 407 is detected as the second edge.

In FIG. 4C, the articles 415 and 419 are placed on top of the article 413, and the article 417 is placed on top of the article 415. The articles 415 and 417 are placed forward of the article 419, and the edge 420 of the article 419 is located higher than the edge 418 of the article 417. In this case, the edge 420 is detected as the first edge, and a part of the edge 418 is detected as the second edge.

In FIG. 4D, the article 423 is placed on top of the article 421, and the article 425 is placed on top of the article 423. In this case, the edge 426 of the article 425 is detected as the first edge, and the edge 424 of the article 423 is detected as the second edge. In FIG. 4E, the articles 429 and 431 are placed on top of the article 427, and the height of the edge 430 of the article 429 is the same as the edge 432 of the article 431. In this case, the edge 432 is detected as the first edge, and a part of the edge 428 is detected as the second edge. In FIG. 4F, the articles 435 and 439 are placed on top of the article 433, and the article 437 is placed on the article 435. The articles 435 and 437 are placed forward of the article 439, and the edge 440 of the article 439 is located the same height as that of the edge 438. In this case, the edge 438 is detected as the first edge, and the edge 436 of the article 435 is detected as the second edge.

In the examples shown in FIGS. 4A through 4F, the width of the region determined based on the first edge (i.e., a dimension in the Y-axis direction) is the same as the width of the first edge. The width of the region determined based on the first edge may be changeable during operation. FIGS. 4G and 4H illustrate detection of the second edge in a case where the width of the region determined based on the first edge is set to be greater than the width of the first edge. The arrangement of articles shown in FIG. 4G is the same as that shown in FIG. 4A. In FIG. 4G, a part of the edge 406 located the same height as the first edge is detected as the second edge. The arrangement of articles shown in FIG. 4H is the same as that shown in FIG. 4B. In the example shown in FIG. 4H, the edge 410 of the article 409 contiguous to the article 411 is detected as the second edge.

Thus, if the width of the region for detecting the second edge is set wide, an edge of a contiguous article may be detected as the second edge. As a result, immediately after the gripper 102 grips and lifts up the article, it is possible to prevent a collision between an article being gripped and a contiguous article in a case where the gripper 102 needs to be moved to avoid some kind of obstacle in a width direction.

Next, the operation of the article handling apparatus 100 will be explained.

Figure 5:
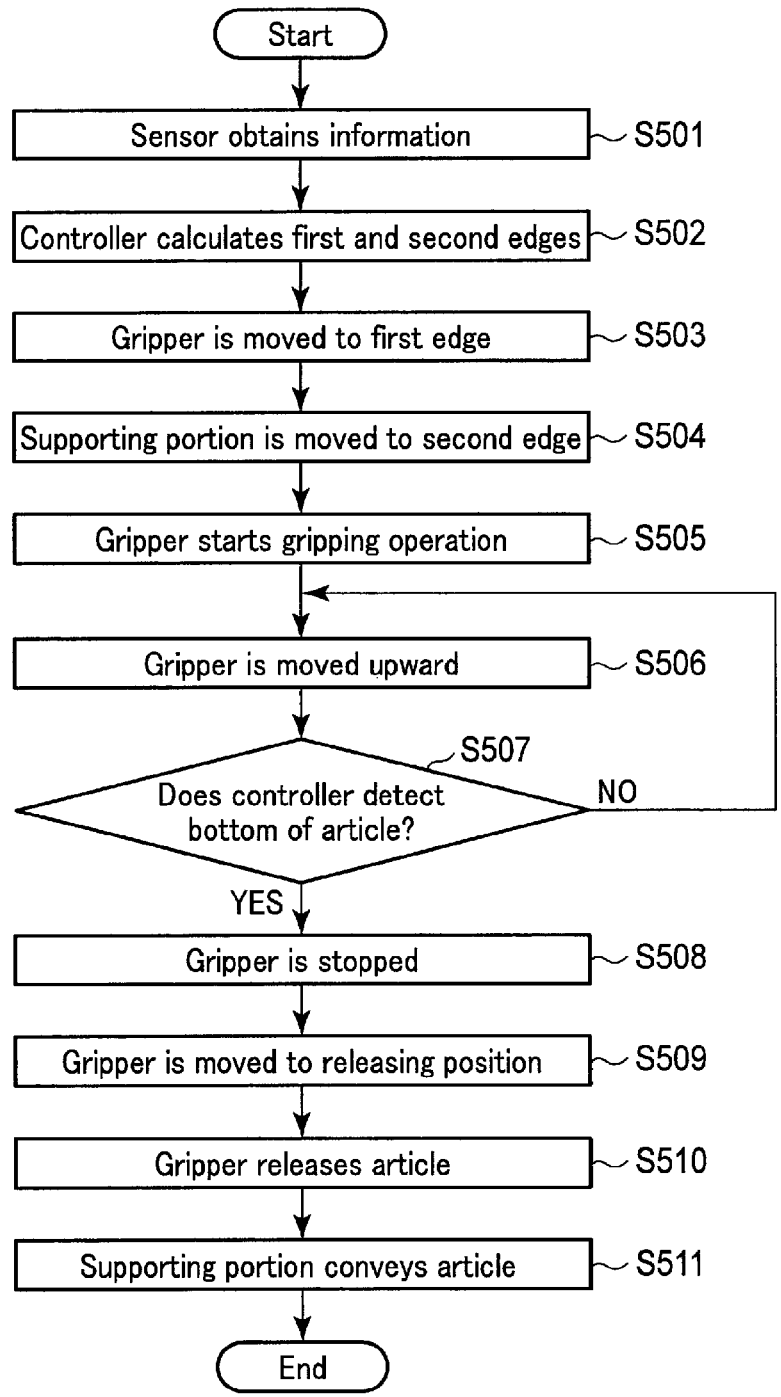
FIG. 5 is a flowchart showing an example procedure for transferring articles by the article handling apparatus shown in FIG. 1.
Figure 6A:
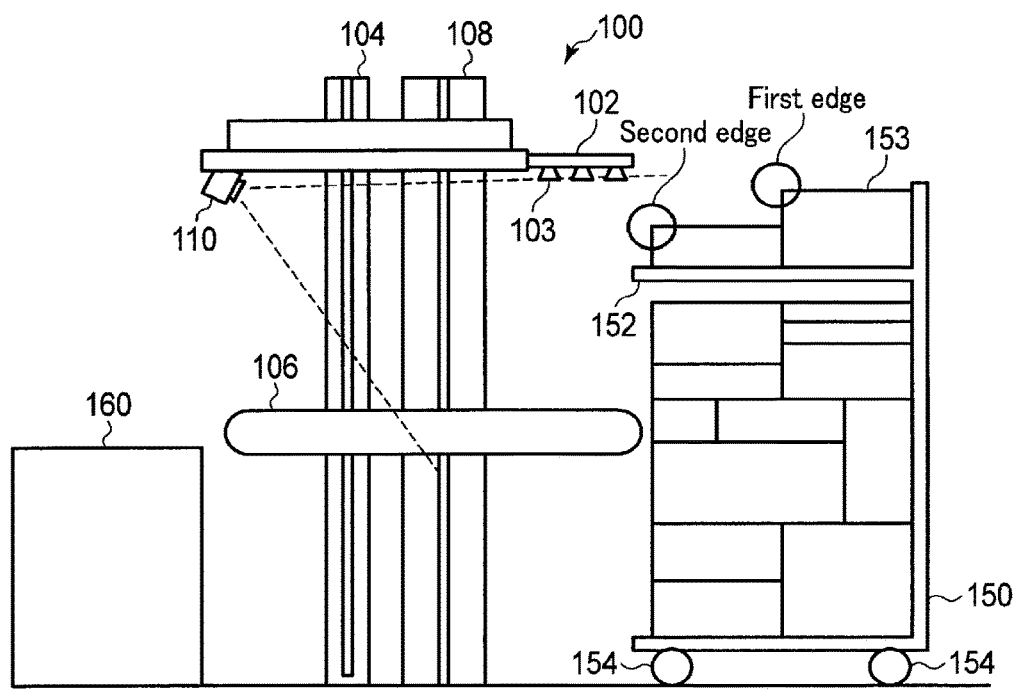

FIG. 5 schematically shows the example operation of the article handling apparatus 100. In step S501 shown in FIG. 5, the sensor 110 recognizes the articles stacked on the box pallet 150, and obtains information of these articles. For example, as shown in FIG. 6A, the sensor 110 and the supporting section 106 are moved to a recognition position, and the sensor 110 recognizes the articles on the intermediate shelf 152 of the box pallet 150.

Figure 6B:
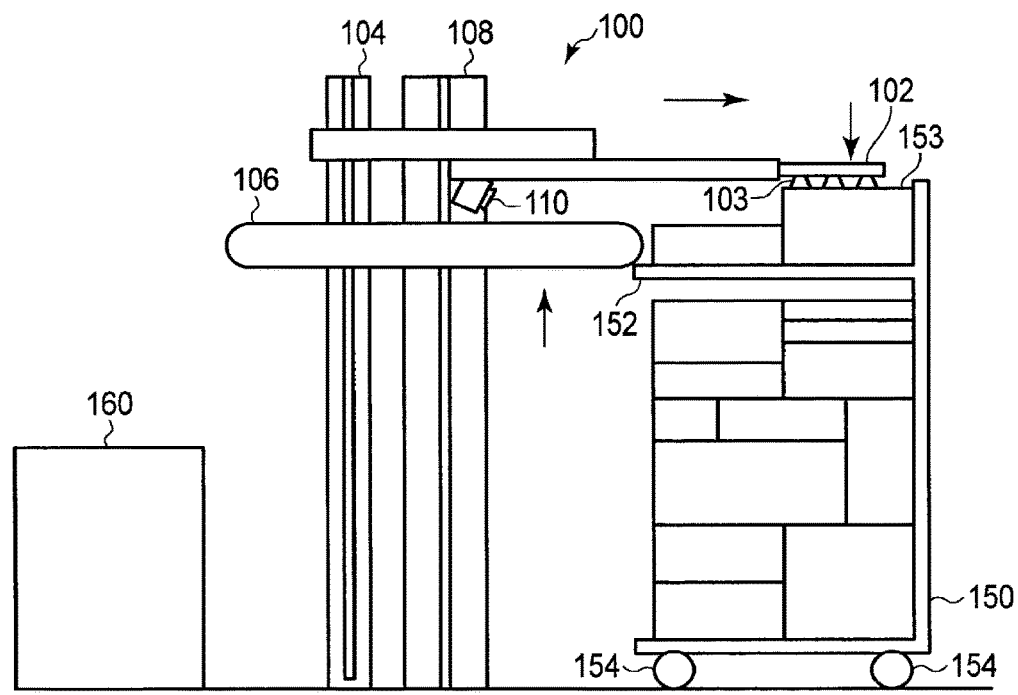

In step S502, the controller 112 calculates the position of the first edge and the position of the second edge based on the information obtained by the sensor 110. In step S503, the gripper 102 is driven to the first edge. In step S504, the supporting portion 106 is driven to the second edge. The process in step S504 may be performed in parallel with the process in step S503, or before the process in step S503. If the process in step S503 is performed in parallel with the process in step S504, it is possible to cut the time. For example, as shown in FIG. 6B, the gripper 102 is moved forward (i.e., in the positive X-axis direction) and then downward so that the suction cups 103 touch the upper surface of the target article. Furthermore, the supporting portion 106 is moved upward until the upper surface of the supporting portion 106 comes to the same height as the second edge.

Figure 7:
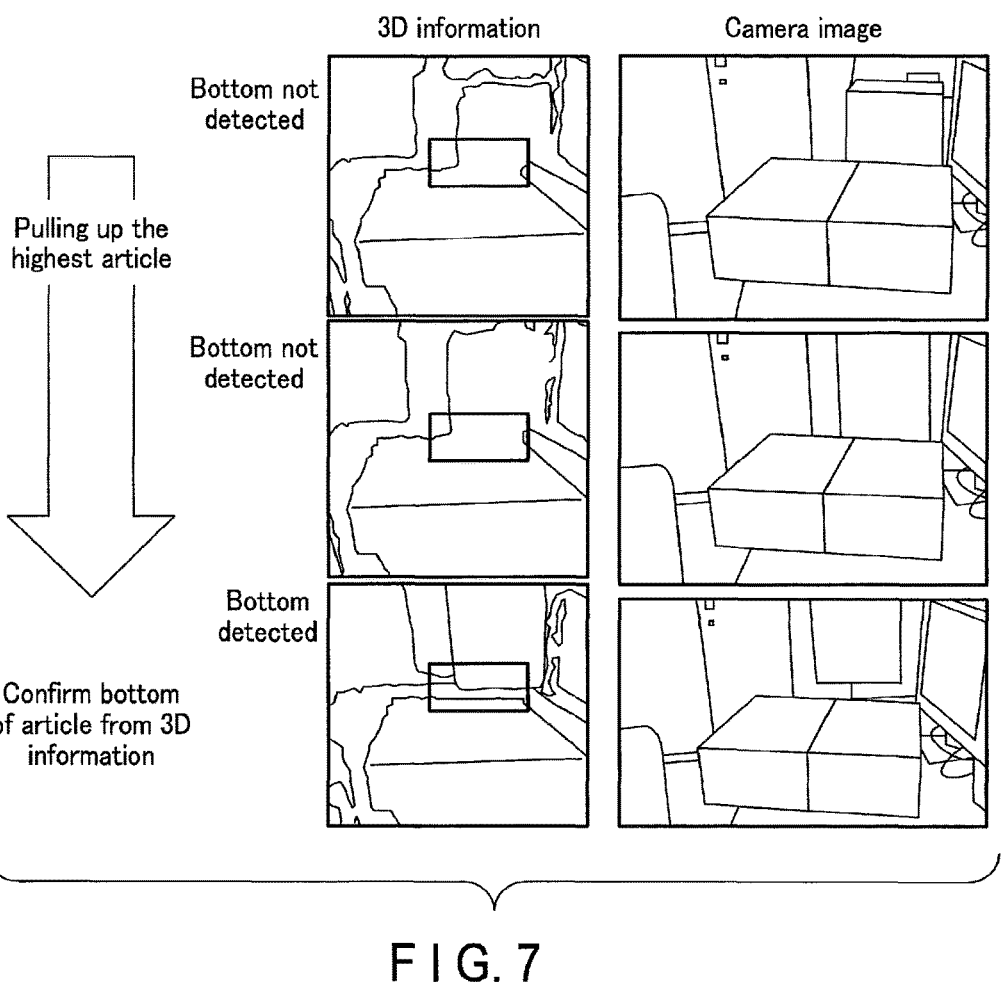
FIG. 7 is a schematic vies illustrating a process for detecting the bottom of an article.

In step S505, the gripper 102 starts a gripping operation. For example, an electromagnetic valve connecting the suction cups 103 with the vacuum pump is released so that the suction cups 103 adhere to the target article. In step S506, the gripper 102 is moved upward to lift up the target article. While the gripper 102 is moved upward, the sensor 110 continuously obtains images. The controller 112 continues moving the gripper 102 upward until the bottom of the target article is detected (step S507). The controller 112 calculates a region immediately below the first edge and corresponding to the height of the second edge, and when it is detected that no objects are present in the region, the controller 112 determines that the height of the second edge and the height of the bottom of the target article are the same. FIG. 7 shows an example of article bottom detection based on recognition data. As shown in FIG. 7, the bottom of the target article can be easily detected by checking whether data of the height corresponding to the second edge is continuous in the region immediately below the first edge. When the bottom of the target article is detected, the controller 112 stops moving the gripper 102 upward in step S508. For example, as shown in FIG. 6C, the gripper 102 is moved upward until the bottom of the target article reaches the same height as the second edge. Thus, the target article can be pulled out with a minimum amount of lifting.

In step S509, the gripper 102 is moved backward to the article releasing position (i.e., in the negative X-axis direction with respect to the stacked articles). For example, as shown in FIG. 6D, the gripper 102 is moved backward so that the target article is located above the supporting unit 106. In step S510, the gripper 102 releases the target article. For example, the electromagnetic valve connecting the suction cups 103 with the vacuum pump is closed. Thus, as shown in FIG. 6E, the target article is placed on the supporting portion 106.

In step S511, the supporting portion 106 conveys the article. In the present embodiment, the supporting portion 106 is a belt conveyor, as mentioned above. The supporting portion 106 is moved downward until it reaches the same height as the belt conveyor 160, as shown in FIG. 6F, and the supporting portion 106 is driven to convey the target article to the belt conveyor 160, as shown in FIG. 6G. Finally, as shown in FIG. 6H, the target article is loaded onto the belt conveyor 160. With the supporting portion 106, it is possible to convey without dropping an article to the belt conveyor 160, even if the article is difficult to grip by the gripper 102.

Thus, an article is transferred from the box pallet 150 to the belt conveyor 160. To transfer another article, the process returns to step S501.

The process in step S507 may be omitted. In this case, a procedure of moving the gripper 102 upward for a certain distance after the gripper 102 grips an article, for example, can be applied. However, this procedure is applicable only to a case of a limited variation in the article sizes; thus, the procedure is less versatile. In order to convey a great variety of articles safely and reliably, performing the process in step S507 is desirable. An amount of lifting can be minimized if the process in step S507 is performed. As a result, the possibility of damaging articles from a fall can be reduced.

It should be noted, however, that the bottom of the target article may not be detected even when the process in step S506 and step S507 is performed. For example, in a case where an article with a height or an article located high is lifted, the gripper 102 reaches the limit of its movable range before the bottom of the article is detected, and the gripper 102 cannot be moved further upward. In this case, the gripper 102 is moved downward to the gripping operation start position to place the target article back to the original position, and releases the target article. The original position of the target article refers to a position where the target article is in the stacked articles immediately before the gripping operation is started.

Figure 8:
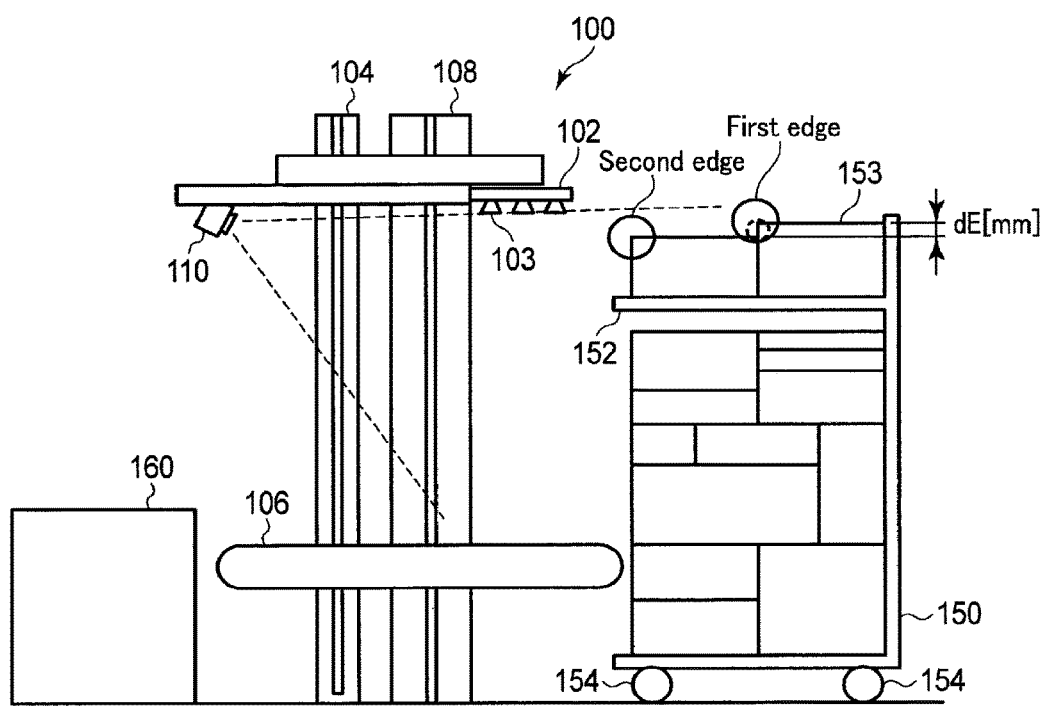
FIG. 8 is a side view of an article arrangement example in a case where a height difference between the first edge and the second edge is small.

In the present embodiment, the gripper 102 and the supporting portion 106 are moved along the same Z axis; thus, when a height difference dE between the first edge and the second edge is small, the gripper 102 and the supporting portion 16 may collide. The height difference dE becomes small when the target article is thin, or in a case as shown in FIG. 8, for example.

FIG. 9 schematically shows another example of the operation of the article handling apparatus 100. The operation shown in FIG. 9 includes a process of preventing the above-described errors. Since the process in step S501 through S511 shown in FIG. 9 is the same as the process described with reference to FIG. 5, a detailed description thereof is omitted.

In step S501, the sensor 110 recognizes the articles stacked on the box pallet 150 and obtains data of those articles. The data is stored as recognition data A. In step S502, the controller 112 calculates the first edge and the second edge.

Figure 10:
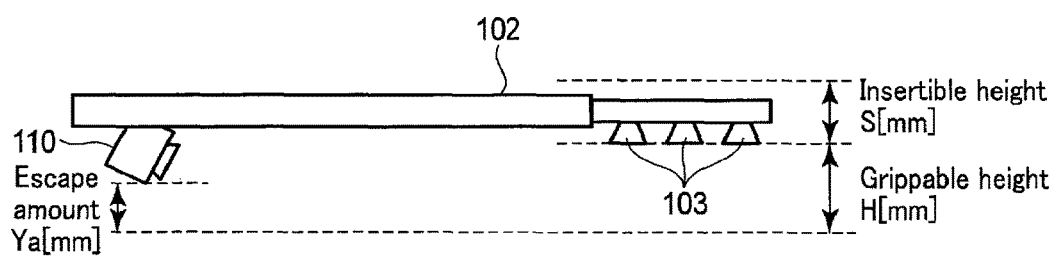
FIG. 10 is a side view showing a grippable height and an insertable height.

In step S901, the controller 112 determines whether or not the height difference dE between the first edge and the second edge is greater than a grippable height H. The grippable height H is set as shown in FIG. 10, for example. In other words, a reference is defined from the bottom of the sensor 110 at a position below an escape amount Ya [mm], and the height difference between the reference and the bottom of the suction cups 103 is set as the grippable height H.

If the height difference dE is greater than the grippable height H, the process proceeds to step S503; if not, the process proceeds to step S902. In step S902, the controller 112 increases a value corresponding to the position of the second edge by the value H in the Z-axis direction; in other words, the movement target position of the supporting portion 106 is adjusted downward for the value H. Thus, the collision of the gripper 102 and the supporting portion 106 can be prevented.

In step S503, the gripper 102 is driven to the first edge. In step S504, the supporting portion 106 is driven to the second edge. In step S505, the gripper 102 starts the gripping operation. In step S506, the gripper 102 is moved upward. In step S507, the controller 112 determines whether or not the bottom of the target article is detected. If the bottom of the target article is not detected, the process proceeds to step S903. In step S903, it is determined whether a certain length of time N has elapsed since moving the gripper 102 upward started, or the gripper 102 reaches the limit of its movable range. The time N can be set within the range between 2 to 15 seconds, for example. When a certain amount of time N has elapsed since moving the gripper 102 upward started, or when the gripper 102 reaches the limit of its movable range, the process proceeds to step S904; if not, the process returns to step S506.

In step S904, the gripper 102 is returned to the gripping start position and releases the article. In other words, the gripper 102 places the article back to the original position. In step S905, the controller 112 deletes data about a region corresponding to the first edge from the recognition data A and updates the recognition data A. FIG. 11A illustrates the recognition data A, and FIG. 11B illustrates the updated recognition data A. In the recognition data A in FIG. 11B, the part corresponding to the first edge in FIG. 11A is deleted. Then, in step S502, the controller 112 obtains a new first edge and second edge based on the updated recognition data A.

Thus, which article should be pulled out next can be determined without the article handling apparatus 100 returning to the recognition position. Thus, the next operation can be performed without unnecessary movement, such as the gripper 102 and the supporting portion 106 returning to the recognition position. The operation as described above allows attempting a grippable and conveyable article one after another, without stopping at one error. As a result, the conveyance efficiency improves.

Figure 12:
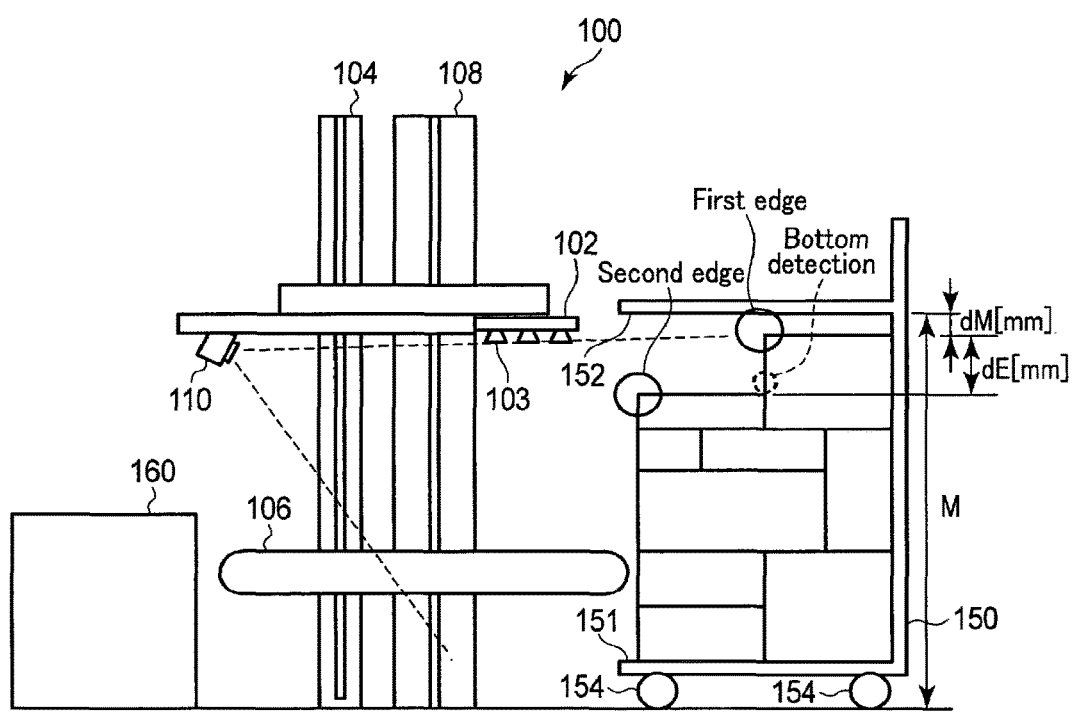
FIG. 12 is a side view illustrating transferring of articles placed below an intermediate shelf of the box pallet.

The process of checking the upper limit of a removable range as illustrated in step S903 is arbitrarily changed in accordance with a surrounding environment of the articles. For example, as shown in FIG. 12, when the articles below the intermediate shelf 152 are transferred, the height M of the intermediate shelf 152 is set at the upper limit of the movable range of the gripper 102. The height M of the intermediate shelf 152 is registered in advance.

Figure 13:
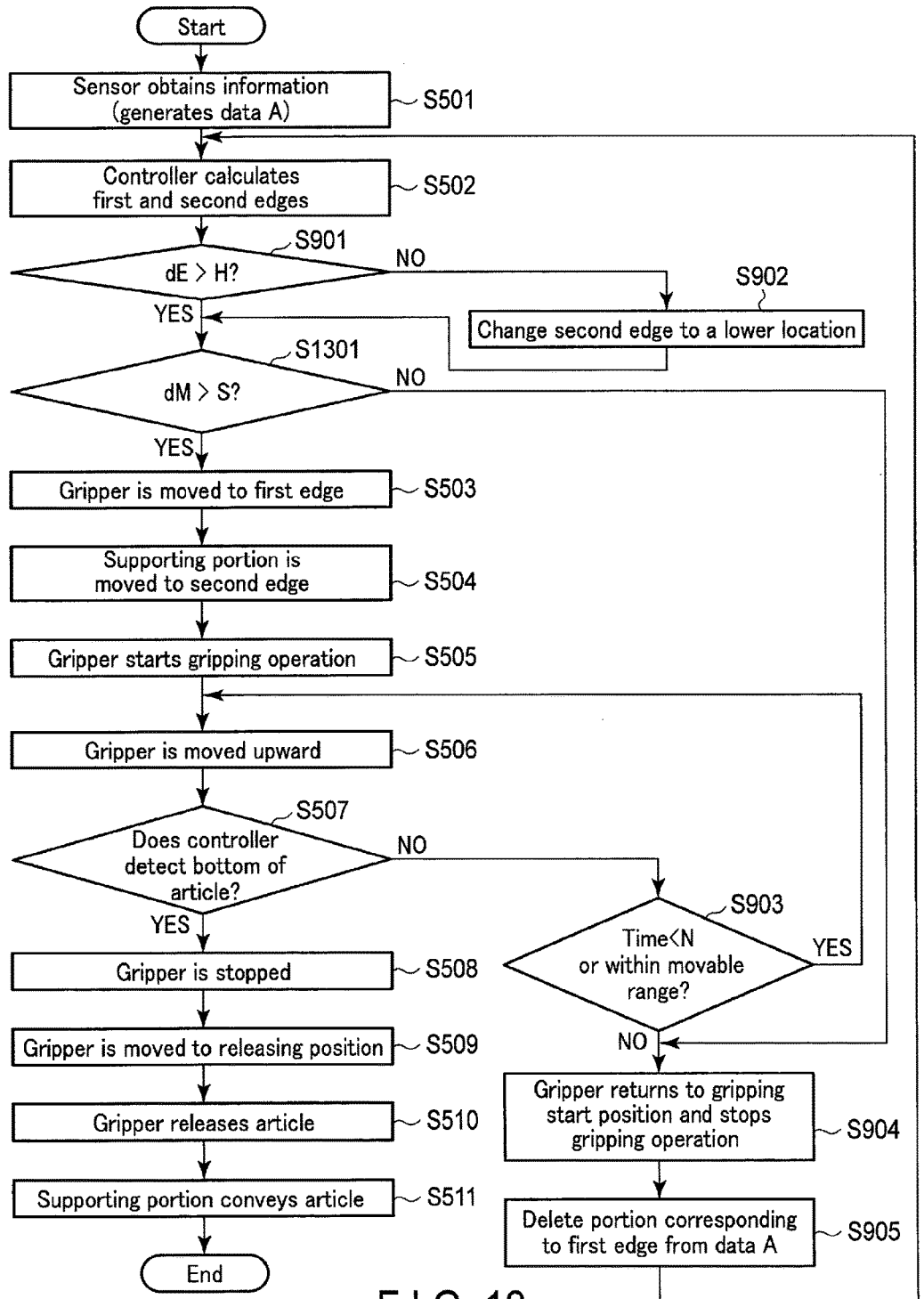
FIG. 13 is a flowchart of an example procedure for transferring articles by the article handling apparatus shown in FIG. 1 when articles placed below an intermediate shelf of the box pallet are transferred.

FIG. 13 illustrates an example operation of the article handling apparatus 100 in a case where the articles located below the intermediate shelf 152 are transferred. Since the process except for step S1301 shown in FIG. 13 is explained with reference to FIGS. 5 and 9, the description thereof is omitted.

In step S1301, the controller 112 determines whether or not the height difference dM between the intermediate shelf 152 and the first edge is greater than the insertible height S of the gripper 102. If dM>S, the process proceeds to step S503; if dM≤S, the process proceeds to step S904. If dM≤S, the gripper 102 cannot be inserted between the intermediate shelf 152 and the target article; in other words, the gripper 102 cannot lift up the target article. Accordingly, a new first edge and a second edge are obtained through the process in steps S904, S905, and S502.

In the process in step S903, the movable range of the driving mechanism 104 in the Z-axis direction is limited under the height of the intermediate shelf 152. Thus, the gripper 102 can be prevented from colliding with the intermediate shelf 152.

Thus, by adding the process in step S1301 and appropriately changing the movable range of the gripper 102 in step S903, the article handling apparatus 100 can deal with a loading region having an intermediate shelf without greatly changing the system.

As described above, the article handling apparatus according to the first embodiment calculates the position of a first article which is located the highest among the stacked articles, calculates the position of a second article which is located the second highest in a region determined based on the position of the first article, controls the movement of the gripper based on the position of the first article, and controls the movement of the supporting portion based on the position of the second article. Therefore, the articles can be unloaded when the articles are stacked in a complicated manner.

Second Embodiment

In the first embodiment, the gripper grips an article from above. In the second embodiment, the gripper grips an article from a side.

Figure 14C:
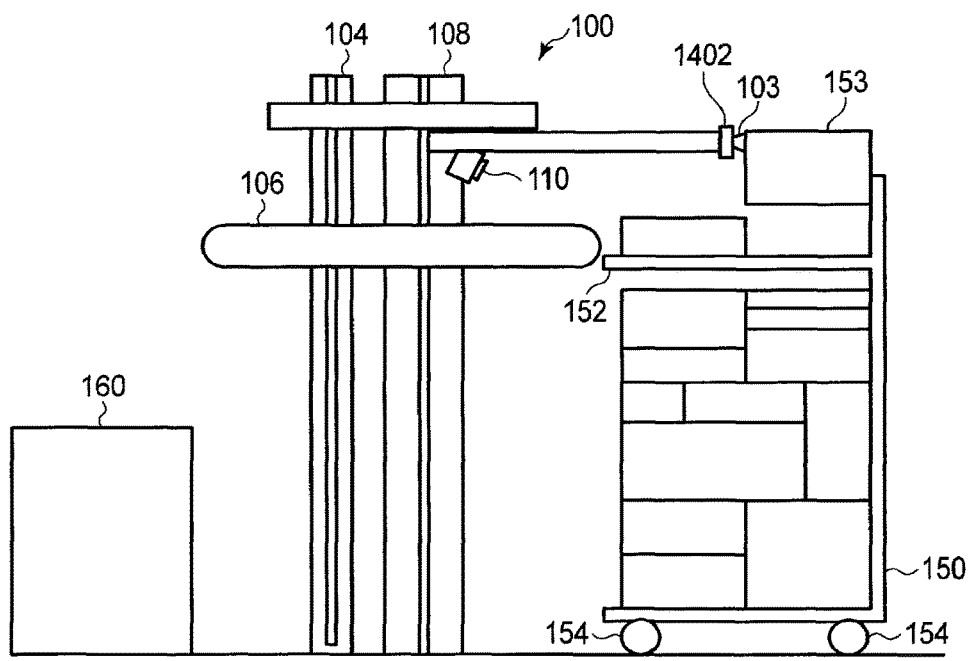

An example of the operation of the article handling apparatus according to the second embodiment will be described with reference to FIGS. 14A to 14E. The suction cups 103 are provided on the side surface of the gripper 1402, as shown in FIG. 14A. The sensor 110 and the supporting portion 106 move to the recognition position, and the sensor 110 recognizes the articles on the intermediate shelf 152 of the box pallet 150. The controller 112 calculates the position of the first edge and the position of the second edge based on a result of recognition by the sensor 110. As shown in FIG. 14B, the gripper 1402 is moved downward and then forward so that the suction cups 103 touch the front surface of the target article. Furthermore, the supporting portion 106 is moved upward to the same height as the second edge.

Figure 14D:
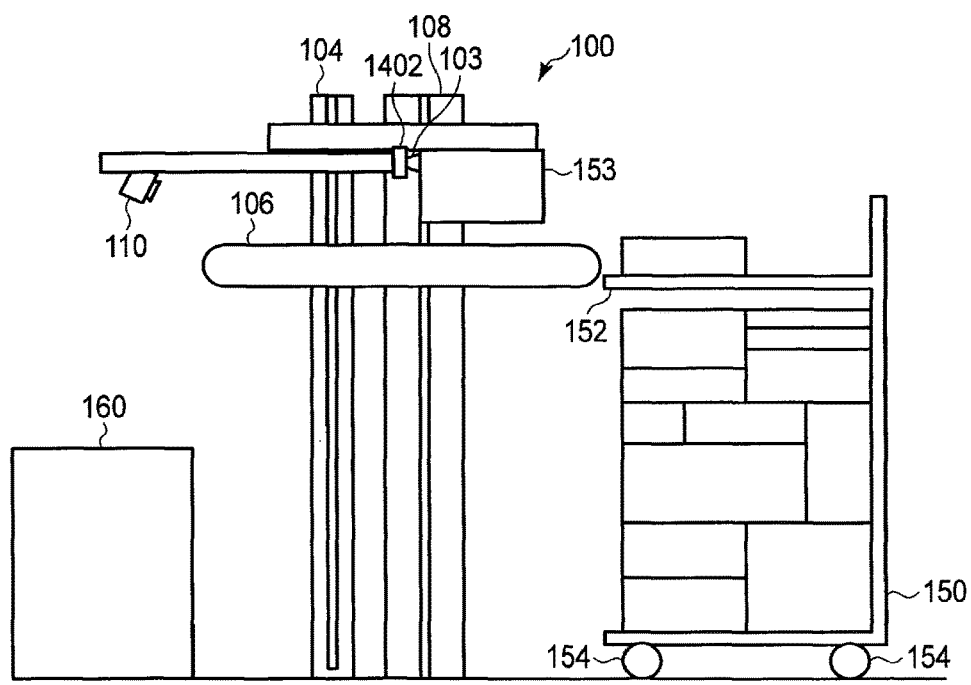

As shown in FIG. 14C, the gripper 1402 is moved upward until the bottom of the target article is detected by the controller 112. As shown in FIG. 14D, the gripper 1402 is moved backward so that the target article is located above the supporting portion 106. As shown in FIG. 14E, the gripper 1402 releases the target article, thereby placing the target article on the supporting portion 106. Since the operation of the supporting portion 106 is the same as described above, the description thereof is omitted.

In a similar manner as in the first embodiment, the article handling apparatus according to the second embodiment can unload the articles even when the articles are stacked in a complicated manner.

Third Embodiment

FIG. 15A schematically shows an article handling apparatus according to the third embodiment. The article handling apparatus 100 as shown in FIG. 15A includes a gripper 1502 which grips articles, a driving mechanism 1504 which moves the gripper 1502, a supporting portion 106 which supports the articles from below, and a driving mechanism 108 which moves the supporting portion 106. Although not shown in FIG. 15A, the article handling apparatus may further include the sensor 110 and the controller 112 (as shown in FIG. 1), etc. which are described in the first embodiment. For example, the sensor 110 may be provided in the supporting portion 106.

The driving mechanism 1504 is fixed to the ceiling (not shown). The gripper 1502 is connected to the driving mechanism 1504, and is movable in a vertical direction. The suction cups 103 are provided on the bottom surface of the gripper 1502. The driving mechanism 108 is provided on a moving table 1520. The moving table is movable in a one-axis direction (in this example, in a forward and backward direction). The supporting portion 106 is connected to the driving mechanism 108, and is movable in a vertical direction. A loading region 1550 is provided on the moving table 1520. A plurality of articles 1553 are stacked on the loading region 1550.

An example of the operation of the article handling apparatus according to the third embodiment will be described with reference to FIG. 15B to FIG. 15J. First, the sensor 110 recognizes the article on the loading region 1550. The controller 112 calculates the position of the first edge and the position of the second edge based on a result of recognition at the sensor 110. As shown in FIG. 15B, the gripper 1502 is moved downward so that the suction cups 103 touch the upper surface of the target article. The gripper 1502 grips the target article by suction. Furthermore, the supporting portion 106 is moved upward to the same height as the second edge.

As shown in FIG. 15C, the gripper 1502 is moved upward until the bottom of the target article is detected by the controller 112. As shown in FIG. 15D, the moving table 1520 moves forward so that the target article is located above the gripper 106. As shown in FIG. 15E, the gripper 1502 releases the target article, thereby placing the target article on the supporting portion 106. As shown in FIG. 15F, the moving table 1520 moves backward, and the supporting portion 106 is driven so that the target article is conveyed to the belt conveyor 160 which is similar to the one described in the first embodiment.

If the operation of transferring articles is continued, the sensor 110 recognizes the articles on the loading region 1550 again, and the controller 112 calculates the position of the first edge and the position of the second edge based on a result of recognition at the sensor 110. As shown in FIG. 15G, the gripper 1502 is moved downward, grips the target article by suction, and is moved upward. As shown in FIG. 15H, the moving table 1520 moves forward, and as shown in FIG. 15I, the gripper 1502 releases the target article, thereby placing the target article on the supporting portion 106. Next, the moving table 1520 moves backward, and the supporting portion 106 is driven to convey the target article.

In a manner similar to the first embodiment, the article handling apparatus according to the third embodiment can unload the articles even when the articles are stacked in a complicated manner.

Figure 16:
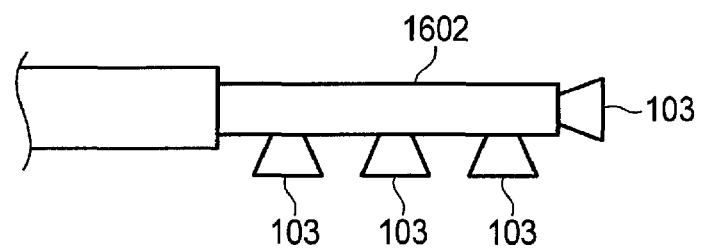
FIG. 16 is a side view of a modification example of the gripper.

The structures and flows described above may be modified or combined as needed, without departing from the spirit thereof, when they are carried out. For example, the gripper may be designed so that it can grip an article both from above and from the side. Specifically, the suction cups 103 may be provided on both of the side surface and the upper surface of the gripper 1602, as shown in FIG. 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article handling apparatus comprising:
a gripper which grips an article;
a supporting portion which supports an article from below;
a sensor which recognizes a plurality of articles to generate a recognition result; and
a controller which calculates a position of a first edge of a first article located highest among the plurality of articles based on the recognition result, the first edge being formed by an upper surface and a side surface of the first article, calculates a position of a second edge of a second article located second highest in a region determined based on the position of the first edge of the first article, the second edge being formed by an upper surface and a side surface of the second article, controls movement of the gripper based on the position of the first edge of the first article, and controls the movement of the supporting portion based on the position of the first edge of the first article and the position of the second edge of the second article, wherein the controller performs a process of detecting a bottom of the first article based on the recognition result by the sensor during a period in which the first article is lifted up using the gripper, and the controller stops moving the gripper upward after detecting the bottom of the first article.

2. The apparatus according to claim 1, wherein the controller moves the gripper in a horizontal direction with respect to the plurality of articles after stopping moving the gripper upward.

3. The apparatus according to claim 1, wherein if the gripper reaches a movable range limit while the first article is lifted up using the gripper, the controller controls the gripper to take out an article different from the first article, without retreating the gripper to a recognition position where the sensor performs recognition.

4. The apparatus according to claim 1, wherein the controller controls the gripper to place the first article back to an original position if the gripper reaches a movable range limit before the bottom of the first article is detected.

5. The apparatus according to claim 1, wherein if the gripper reaches a movable range limit while the first article is lifted up using the gripper, the controller calculates a position of a third article located highest among the plurality of articles except for the first article, calculates a position of a fourth article located second highest in a region determined based on the position of the third article, controls movement of the gripper based on the position of the third article, and controls movement of the supporting portion based on the position of the fourth article.

6. An article handling apparatus comprising:
a gripper which grips an article;
a supporting portion which supports an article from below;
a database in which information about a plurality of articles is registered; and
a controller which calculates a position of a first edge of a first article located highest among the plurality of articles by referring to the database, the first edge being formed by an upper surface and a side surface of the first article, calculates a position of a second edge of a second article located second highest in a region determined based on the position of the first edge of the first article, the second edge being formed by an upper surface and a side surface of the second article, controls movement of the gripper based on the position of the first edge of the first article, and controls the movement of the supporting portion based on the position of the first edge of the first article and the position of the second edge of the second article, wherein the controller performs a process of detecting a bottom of the first article based on a result of recognition by the sensor during a period in which the first article is lifted up using the gripper, and the controller stops moving the gripper upward after detecting the bottom of the first article.

* * * * *